(12) United States Patent
Ishii

(10) Patent No.: US 8,179,401 B2
(45) Date of Patent: May 15, 2012

(54) REDUCING IMAGE ARTIFACTS IN A COLOR SEQUENTIAL DISPLAY SYSTEM

(75) Inventor: Takatoshi Ishii, Sunnyvale, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 532 days.

(21) Appl. No.: 12/469,924

(22) Filed: May 21, 2009

(65) Prior Publication Data

US 2010/0295866 A1    Nov. 25, 2010

(51) Int. Cl.
| | |
|---|---|
| G09G 5/00 | (2006.01) |
| G09G 5/02 | (2006.01) |
| H04N 1/40 | (2006.01) |
| H04N 5/14 | (2006.01) |
| H04N 1/46 | (2006.01) |
| H04N 7/12 | (2006.01) |
| G06K 9/00 | (2006.01) |
| H03M 1/12 | (2006.01) |
| H04N 1/405 | (2006.01) |
| H04N 11/02 | (2006.01) |
| G03F 3/08 | (2006.01) |
| G06K 9/40 | (2006.01) |

(52) U.S. Cl. ........ 345/596; 345/589; 345/600; 345/606; 348/254; 348/574; 348/671; 358/3.14; 358/3.01; 358/518; 358/525; 375/240.01; 375/340.27; 382/166; 382/170; 382/254; 382/274

(58) Field of Classification Search ............ 345/581, 345/589, 596, 598, 600–601, 605–606, 611–613; 348/254, 490, 497, 571, 574, 671; 358/1.9, 358/3.01, 3.14, 518, 521–525; 375/240.01, 375/240.27, 240.29; 382/166–167, 170–171

See application file for complete search history.

(56) References Cited

U.S. PATENT DOCUMENTS

| 5,001,651 | A | * | 3/1991 | Rehme et al. | ................. 345/426 |
| 5,611,028 | A | * | 3/1997 | Shibasaki et al. | ............. 345/594 |
| 6,175,355 | B1 | * | 1/2001 | Reddy | ........................... 345/691 |
| 6,362,834 | B2 | * | 3/2002 | Ishii | ............................. 345/690 |
| 6,683,595 | B2 | | 1/2004 | Ikeda | |
| 6,828,961 | B2 | | 12/2004 | Elliott et al. | |

(Continued)

OTHER PUBLICATIONS

Knipe, R.L. (1996). "Challenges of a Digital Micromirror Device™: Modeling and Design," SPIE EurOpto Proceedings, 2783:135-145.

(Continued)

*Primary Examiner* — Wesner Sajous
(74) *Attorney, Agent, or Firm* — Fish & Richardson P.C.

(57) ABSTRACT

Methods, systems, and apparatus, including computer program products, for reducing artifacts in a color sequential display system. A frame of a digital image is displayed by receiving frame data, determining dither patterns, applying the dither patterns to the data, and displaying the dithered data. Each pixel of a frame of a digital image is displayed by receiving pixel data, grouping the pixel data for the color channels of the image into a plurality of sub-groups of pixel data; and displaying the pixel according to a sequence that separates each pair of sub-groups for a color channel by a sub-group for another color channel. Modified pixel data can be generated by replacing parent bits in the pixel data with corresponding pluralities of divided child bits, where all the child bits for a given parent bit have a divided weight that adds up to the parent bit's weight.

24 Claims, 24 Drawing Sheets

U.S. PATENT DOCUMENTS

| | | |
|---|---|---|
| 7,057,597 B2 | 6/2006 | Ikeda |
| 7,119,766 B2 | 10/2006 | Otobe et al. |
| 7,265,736 B2 | 9/2007 | Lee et al. |
| 7,502,040 B2 | 3/2009 | Kawae |
| 7,522,137 B2 | 4/2009 | Park et al. |
| 2003/0095135 A1* | 5/2003 | Kaasila et al. ............... 345/613 |
| 2007/0046591 A1* | 3/2007 | Shishido et al. .............. 345/77 |
| 2007/0205969 A1* | 9/2007 | Hagood et al. ............... 345/84 |
| 2008/0068404 A1* | 3/2008 | Ishii ............................. 345/690 |
| 2009/0033607 A1* | 2/2009 | Fergason ...................... 345/89 |

OTHER PUBLICATIONS van Kessel, P.F., et al. (1998). "A MEMS-Based Projection Display," Proceedings of the IEEE, 86(8):1687-1704.

\* cited by examiner

|   |   |   |   |
|---|---|---|---|
| 0 | 11 | 6 | 9 |
| 7 | 4 | 13 | 2 |
| 12 | 15 | 10 | 3 |
| 3 | 8 | 1 | 14 |

1102

|   |   |   |   |
|---|---|---|---|
| 0 | 13 | 4 | 9 |
| 11 | 6 | 15 | 2 |
| 14 | 3 | 10 | 7 |
| 5 | 8 | 1 | 12 |

REDUCING IMAGE ARTIFACTS IN A COLOR SEQUENTIAL DISPLAY SYSTEM

BACKGROUND

This specification relates to projection display technologies.

Projection display technologies display an image by projecting light corresponding to color channels of the image. A commonly used projection device is a micro-mirror display device that displays the pixels of an image by tilting micro-mirrors to project light to the display (to display the pixel) or to deflect light away from the display (to not display the pixel). The mirrors are tilted using digital control signals derived from bit plane data for the image according to a pulse width modulation scheme. The amount of time that the mirrors are turned on and off controls the intensity for a given pixel and a given color. Traditional micro-mirror displays are color sequential, that is, they project light corresponding to the color channels of an image (e.g., red, green, blue) in sequence. For example, the micro-mirror display device can adjust the mirrors for each bit of data for the red channel and project red light, then adjust the mirrors for each bit of the green channel and project green light, and then adjust the mirrors for each bit of the blue channel and project blue light.

Traditional micro-mirror displays and other projection devices can have artifacts such as color break-up, motion contour, static contour, and jitter. Color break-up occurs most commonly in areas of high contrast in an image, for example, the borders between dark and light areas of the image. When a viewer moves his or her eyes rapidly from left to right across a display screen, or when the areas of light and dark move on the display screen, a viewer may observe a rainbow shadow in the image. This rainbow is a result of the way that the viewer's retina processes the individual bursts of red, green, and blue light.

Motion contour occurs most commonly when objects having a gradual gradation in color (for example, a human face), move against the background of the image, or when a viewer's eye moves across a screen displaying objects having a gradual gradation in color. The motion on the screen can cause a viewer to observe non-existent darker or brighter shadows in the image. The shadows result from the patterns of light produced according to the pulse width modulation scheme.

Static contour occurs when the pixel data for the pixels in the image does not have sufficient bit width (i.e., does not include enough bits) to represent all of the colors in a gradation of colors in the image. When this occurs, the viewer sees edges in the image in places where there should not be edges. Traditional systems decrease static contour by applying a sequence of dither patterns to a sequence of frames of the image. However, jitter can occur when the dither pattern applied to the pixels of an image is noticeable, for example, because the dithering speed is not fast enough given the response time of the screen, or because of visible differences in the intensity values of one or more pixels being dithered. Increasing the dither bit width and the number of frames over which a sequence of patterns is applied reduces static contour, but increases jitter.

SUMMARY

This specification describes technologies relating to dithering between sub-frames and grouping pixel data in a color sequential display system.

In general, one aspect of the subject matter described in this specification can be embodied in a method for displaying a frame of a digital image on a display system that includes the acts of receiving frame data for the frame; determining two or more dither patterns for the frame; applying each of the dither patterns to the frame data, resulting in a sequence of dithered sub-frames; and displaying the frame by displaying the dithered sub-frames in sequence, in place of the frame. Other implementations include corresponding systems, apparatus, computer program products, and computer storage media.

These and other implementations can optionally include one or more of the following features. Determining the dither patterns for each frame can include obtaining dither patterns corresponding to a frame count for the frame and a sub-frame count for each dithered sub-frame. Each dither pattern can be one of a series of temporal and spatial constant dither patterns generated from a dither ordering table. Each dithered sub-frame can be represented as respective pixel data for each respective pixel in the sub-frame and a respective color channel in a plurality of color channels.

Displaying the dithered sub-frames in sequence can include performing the following for each respective pixel: grouping the pixel data for the pixel and each respective color channel into a plurality of sub-groups of pixel data and displaying the pixel according to a sequence for the sub-groups of pixel data, where each pair of sub-groups for a color channel is separated by at least a sub-group for another color channel in the sequence.

The pixel data for each respective pixel and each respective color channel can include an initial plurality of bits, each bit having a value and a weight, and grouping the pixel data for each color channel into a plurality of sub-groups of pixel data can include generating a modified plurality of bits corresponding to the initial plurality of bits where one or more parent bits in the initial plurality of bits is replaced by a plurality of child bits corresponding to the parent bit, where each child bit has a value equal to a value of the parent bit and a divided weight that is proportionate to the weight of the parent bit, and where the divided weights of the child bits corresponding to the parent bit add up to the weight of the parent bit; and displaying the pixel according to the modified plurality of bits and an order for the modified plurality of bits.

A color lookup table can be used to determine a color value for pixels in the frame before a respective dither pattern for each sub-frame is determined.

In general, another aspect of the subject matter described in this specification can be embodied in a method for displaying a pixel of a frame of a digital image on a display system that includes the acts of receiving pixel data for the pixel and each respective color channel in a plurality of color channels, where the data for each pixel comprises a plurality of bits and where each bit in the plurality of bits has a weight; grouping the pixel data for each color channel into a plurality of sub-groups of pixel data; and displaying the pixel according to a sequence for the sub-groups of pixel data, where each pair of sub-groups for a color channel is separated by at least a sub-group for another color channel in the sequence. Other implementations include corresponding systems, apparatus, computer program products, and computer storage media.

These and other implementations can optionally include one or more of the following features. Displaying the pixel can further include generating a sequence of sub-frames for the frame and displaying the pixel according to the sequence of sub-frames.

In general, another aspect of the subject matter described in this specification can be embodied in a method for displaying a pixel of a frame of a digital image on a display system that includes the acts of receiving pixel data for the pixel and a color channel, where the pixel data comprises an initial plurality of bits, each bit having a value and a weight; generating a modified plurality of bits corresponding to the initial plurality of bits where one or more parent bits in the initial plurality of bits is replaced by a plurality of child bits corresponding to the parent bit, where each child bit has a value equal to the value of the respective parent bit and a divided weight proportionate to the weight of the respective parent bit, and where the divided weights of all child bits corresponding to the parent bit add up to the weight of the parent bit; and displaying the pixel according to the modified plurality of bits and an order for the modified plurality of bits.

These and other implementations can optionally include one or more of the following features. The order can separate two bits with a weight above a first threshold by at least one bit with a weight below a second threshold. Displaying the pixel according to the modified plurality of bits can include generating a modified plurality of bits for the pixel for each color channel in a plurality of color channels; grouping the bits in each modified plurality of bits into a plurality of sub-groups of bits according to the order for each modified plurality of bits, where each sub-group includes one or more bits; and displaying the pixel according to a sequence for the sub-groups of bits, where each pair of sub-groups for a color channel is separated by at least a sub-group for another color channel in the sequence.

Particular embodiments of the subject matter described in this specification can be implemented so as to realize one or more of the following advantages. Color break-up in an image can be reduced. Motion contour in an image can be reduced. Static contour in an image can be reduced. Jitter in an image can be reduced. The number of bit planes needed to represent an image can be reduced.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 11 illustrates two examples of a RAM Table (High).

Like reference numbers and designations in the various drawings indicate like elements.

DETAILED DESCRIPTION

Figure 1:
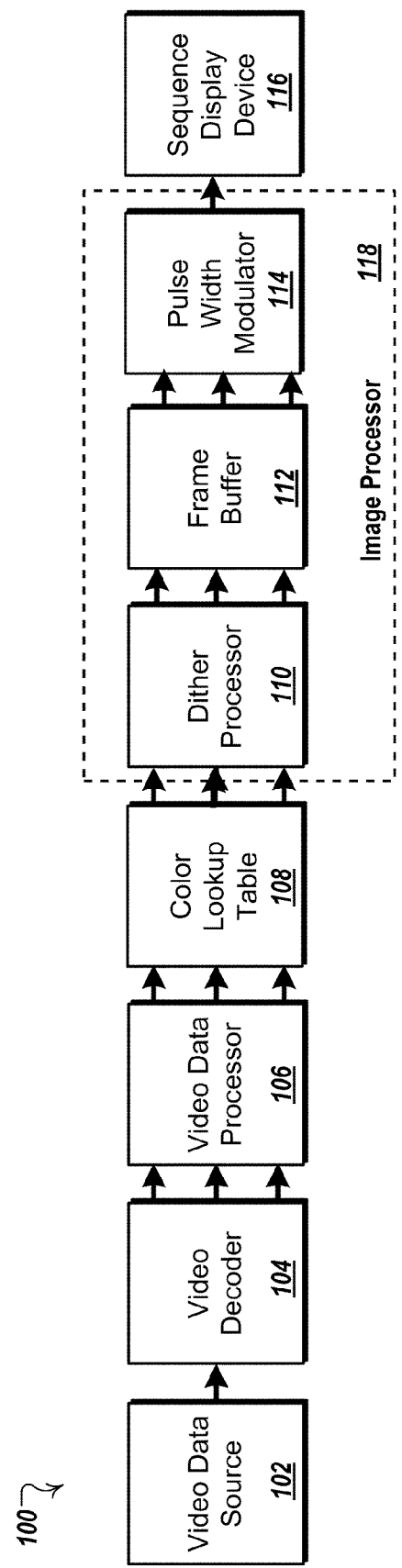
FIG. 1 illustrates an example display system that reduces artifacts in projected images.

FIG. 1 illustrates an example display system 100 that reduces artifacts (e.g., color break-up, motion contour, static contour, and jitter) in projected images. Video data, for example a broadcast signal, is received from a video data source 102. For example, the video data can include three eight-bit composite signals corresponding to Y, Cb, and Cr signals. The video data is processed and then provided to a sequence display device 116 (e.g., a micro-mirror display device) which displays images corresponding to the video data.

The system 100 converts the video data into bit plane data to be used by the sequence display device 116 as follows. The video data is decoded by a video decoder 104. The video decoder 104 converts the video data into decoded video data including multiple signals, one corresponding to each color channel of the image. For example, the decoded video data can include three eight-bit signals corresponding to the red, green, and blue color channels of an image. The decoded video data is then sent to a video data processor 106. The video data processor processes the decoded video data and applies various effects to the data, for example, scaling, color management, and removal of keystone effects. For example, the output of the video data processor can be red, green, and blue data, each in an eight to ten bit format. The system then uses a color lookup table 108 to identify color values for each color channel of each pixel of the image. For example, the output of the color lookup table can be red, green, and blue data, each in a twelve to sixteen bit format. The system then sends the output from the color lookup table to an image processor 118, including a dither processor 110, frame buffer 112, and pulse width modulator 114. The dither processor 110 generates data for two, three, or more dithered sub-frames for each frame of the video and for each color channel. The dithering can reduce the number of bits used for the color channel data, for example, by reducing the format to six to eight bits. The dithered data is then stored in a frame buffer 112 and processed by a pulse width modulator 114. The pulse width modulator receives bit plane data, generates a pulse width modulation signal (e.g., corresponding to bit plane data), and sends the signal to the sequence display device 116. The sequence display device 116 displays all of the multiple dithered sub-frames corresponding to a frame in sequence, during the time the frame would normally be displayed (e.g., 60 Hertz or 50 Hertz).

Dithering over a series of sub-frames can result in a smoother image by reducing jitter by increasing dithering speed by increasing the number of sub-frames in the sequence of dither patterns without requiring different frames to also be dithered as part of the sequence. Displaying a sequence of sub-frames instead of their corresponding frames also increases the frequency with which colors are projected onto the screen, and can help reduce color break-up effects and motion contour.

Figure 2A:
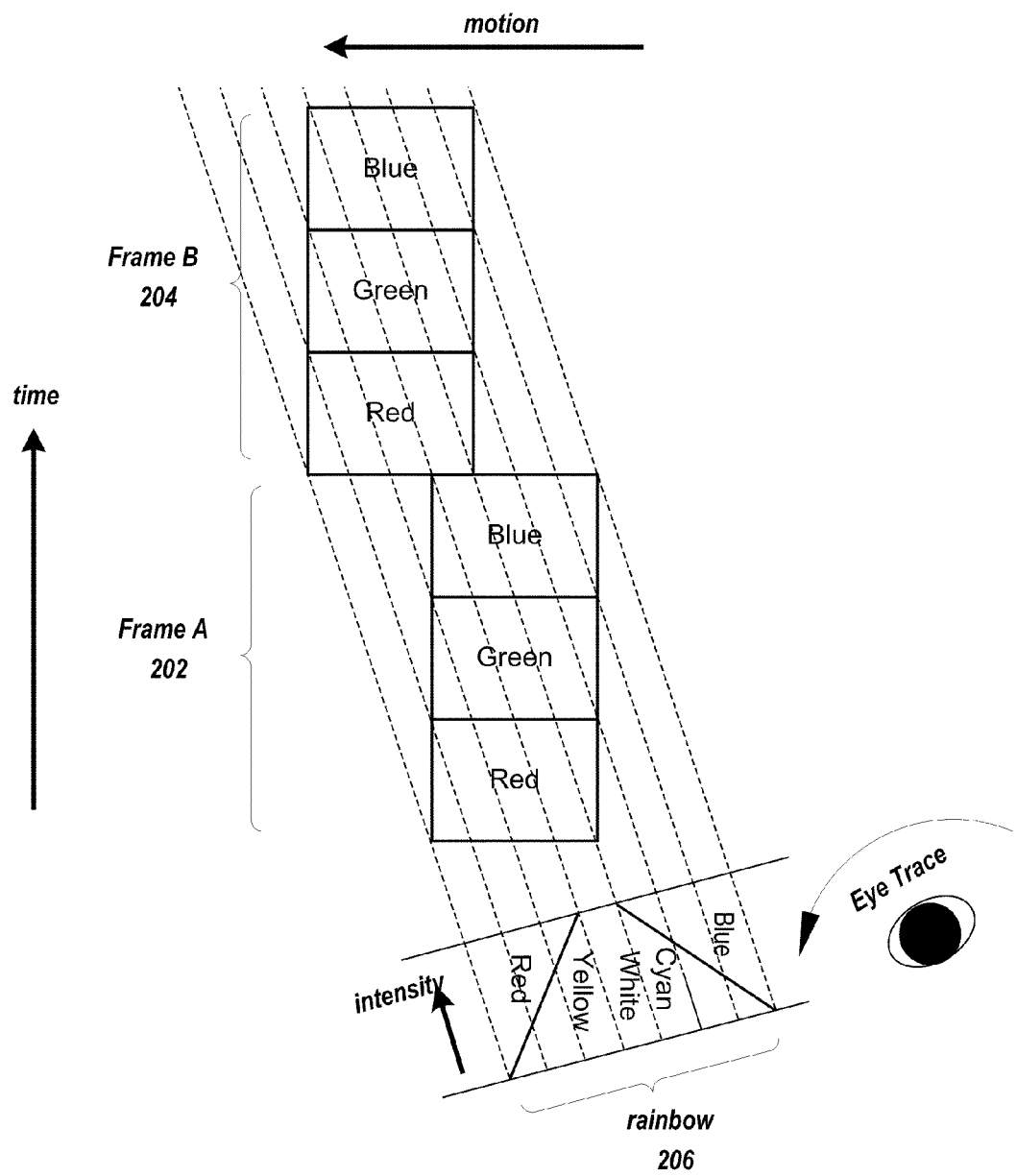
FIGS. 2A-2B illustrate an example of how displaying a sequence of sub-frames in place of a frame of an image can reduce color break-up effects.
Figure 2B:
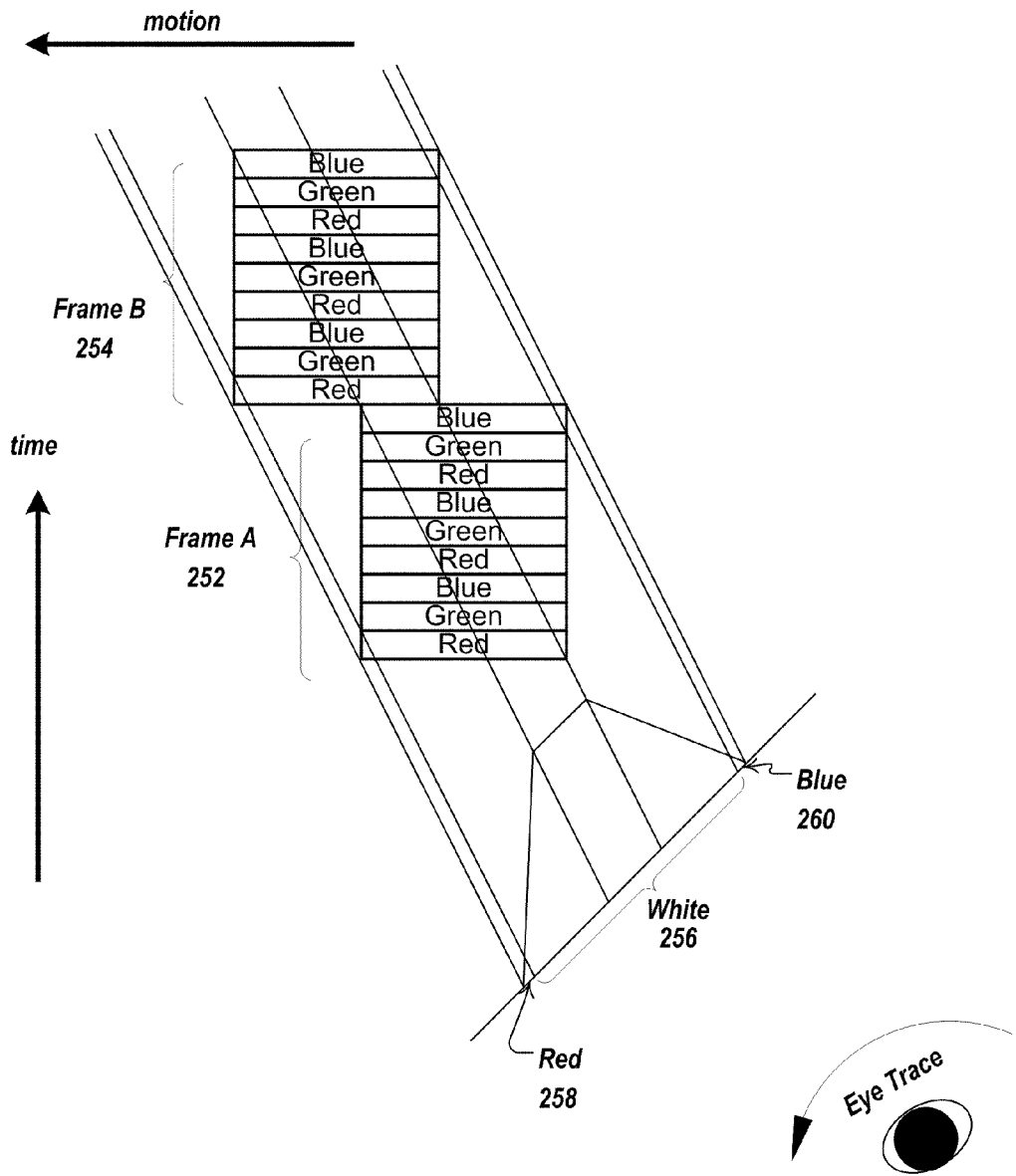

FIGS. 2A-2B illustrate an example of how displaying a sequence of sub-frames in place of a frame of an image can reduce color break-up effects.

FIG. 2A illustrates an example of a color break-up effect in an image that is displayed without the use of sub-frames. As shown in FIG. 2A, two frames are projected in sequence, frame A 202, followed by frame B 204. Each frame is projected by displaying red, green, and blue light in sequence. When there is motion in a high contrast are of the image (for example, when a white line in an image moves against a black background), a viewer's retina perceives a rainbow shadow 206 at the edges of high contrast in the image (for example, on the white line in the image). This rainbow is a result of how the retina processes the flashes of red, green, and blue light that it receives as the frame is projected.

FIG. 2B illustrates an example of how the color break-up effect can be reduced by displaying frame A and frame B 252 and 254, respectively, as sequences of sub-frames. Each frame is projected as a sequence of three sub-frames, and each sub-frame is displayed as a sequence of red, green, and blue lights. The period of time each color light is displayed during a sub-frame is one-third the length of time the color light was displayed in FIG. 2A, when each frame was displayed without sub-frames. The viewer's retina is able to process the shorter flashes of red, green, and blue light better than it processed the longer flashes of light. The retina averages the wavelengths for the lights, resulting in the viewer perceiving a large section of white 256 in the image, where before the viewer perceived a rainbow. While there may still be a small red shadow 258 and a small blue shadow 260 at the edges of the area of white, these shadows are small compared to the initial rainbow effect illustrated in FIG. 2A.

FIGS. 3A-3D illustrate an example of how displaying a sequence of sub-frames in place of a frame of an image can reduce motion contour by averaging motion contour artifacts.

Figure 3A:
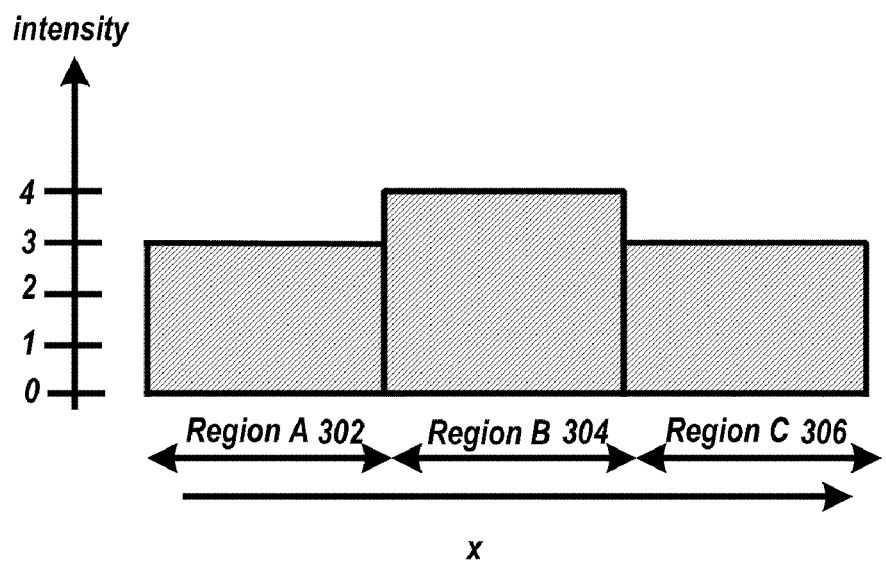
FIGS. 3A-3D illustrate an example of how displaying a sequence of sub-frames in place of a frame of an image can reduce motion contour by averaging motion contour artifacts.

FIG. 3A illustrates the intensity for three regions of an image, region A 302, region B 304, and region C 306 which lie next to each other in an image. Regions A and C 302 and 306 each have an intensity level of 3, while the middle region, region B 304, has an intensity level of 4.

Figure 3B:
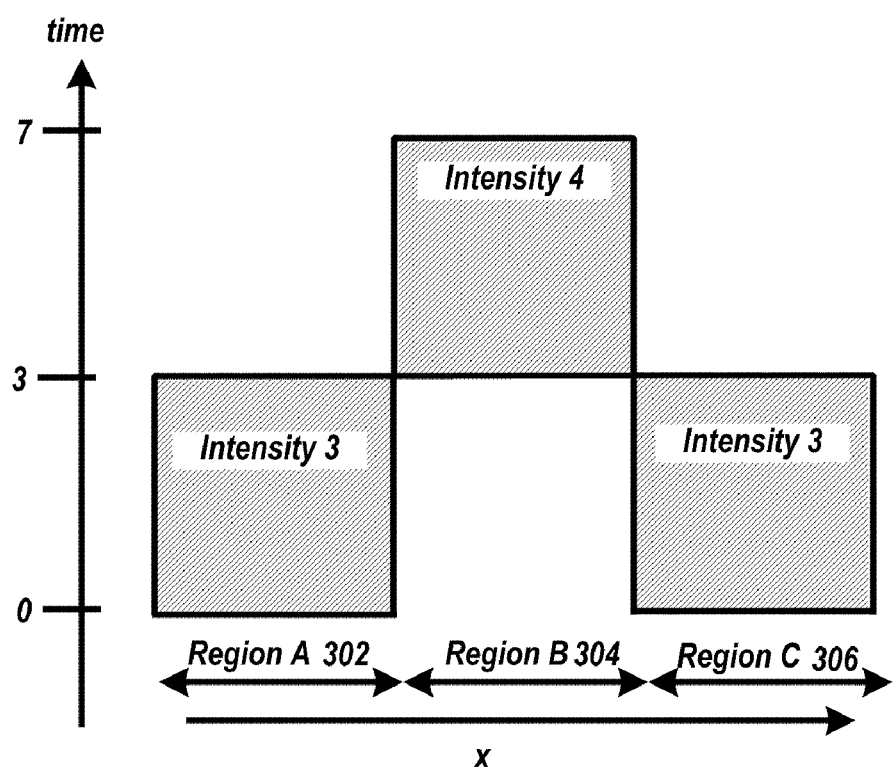

FIG. 3B illustrates the time during which light is projected for regions A, B, and C so that each region will have the appropriate intensity. The timing is determined by a pulse width modulator using a pulse width modulation scheme. Each pixel in a region is "on" (i.e., light is being projected for the pixel) during the periods shaded in the figure. Even though regions A and C 302 and 306 have intensities that differ only by one intensity level from their middle region, region B 304, the pulse width modulator displays light for the pixels in the regions very differently. Pixels in regions A and C 302 and 306 are on from time 0 to 3, during which time pixel in region B 304 are not on. Pixels in region B 304 are on from time periods 3 to 7, during which time pixels in regions A and C 302 and 306 are not on. This timing difference can cause a viewer to see motion contour artifacts in an image, as illustrated in FIG. 3C.

Figure 3C:
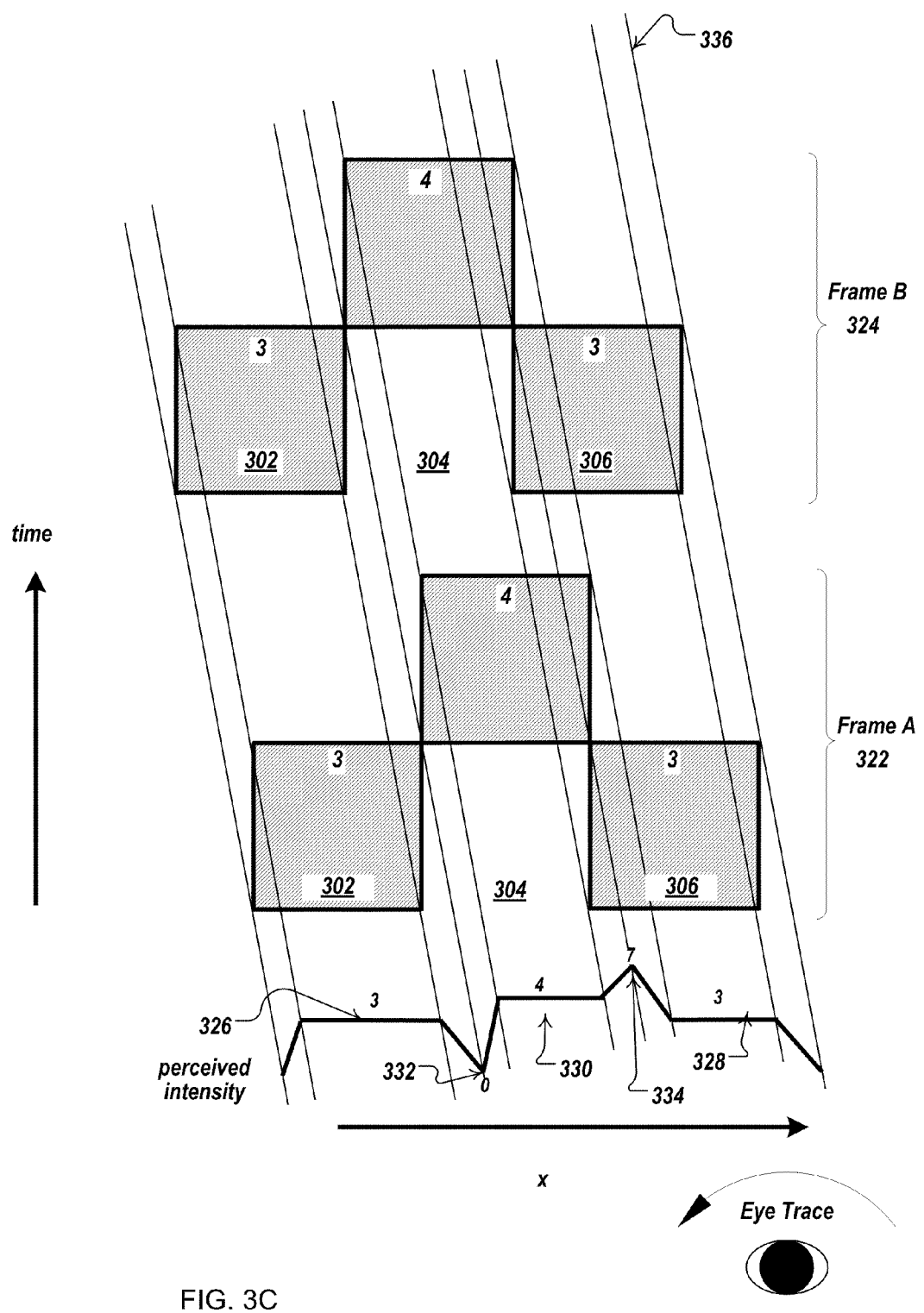

FIG. 3C illustrates an example of motion contour artifacts in an image. FIG. 3C illustrates two frames of an image, frame A 322 and frame B 324, that are displayed in sequence. Each frame includes the same three regions, region A 302, region B 304, and region C 306, but the regions in frame B 324 have moved to the left from their locations in Frame A 322. As the viewer's eyes trace from right to left across the screen as the frames are being displayed, the viewer will perceive the light from the frames along the plane indicated by the slanted lines (e.g., line 336), instead of along the vertical plane (e.g., perpendicular to the screen) that the viewer would see if the image was stationary and the regions did not shift between frames. This difference causes the viewer to perceive phenomena in the moving image that the viewer would not perceive in a stationary image. Most of the time, the viewer will still perceive the correct value for the pixels in the regions. For example, the viewer will perceive the regions 326 and 328 as having an intensity value of three, and the region 330 as having an intensity value of four. However, the viewer will see a dark shadow 332 at the edge between region A 302 and region B 304 and a bright shadow 334 at the edge between region B 304 and region C 306. These shadows are a result of how the viewer's eye perceives the light being projected; for example, at the dark shadow 332, the viewer will perceive no light (an intensity value of zero), and at the bright shadow 334, the viewer will perceive the light for both regions B and C 304 and 306 (an intensity value of seven). While FIG. 3C illustrates a moving image and a viewer whose eye traces across the screen, the same effect can occur when the image is stationary and the viewer moves his or her eyes from left to right across the screen as the frames are being displayed.

Figure 3D:
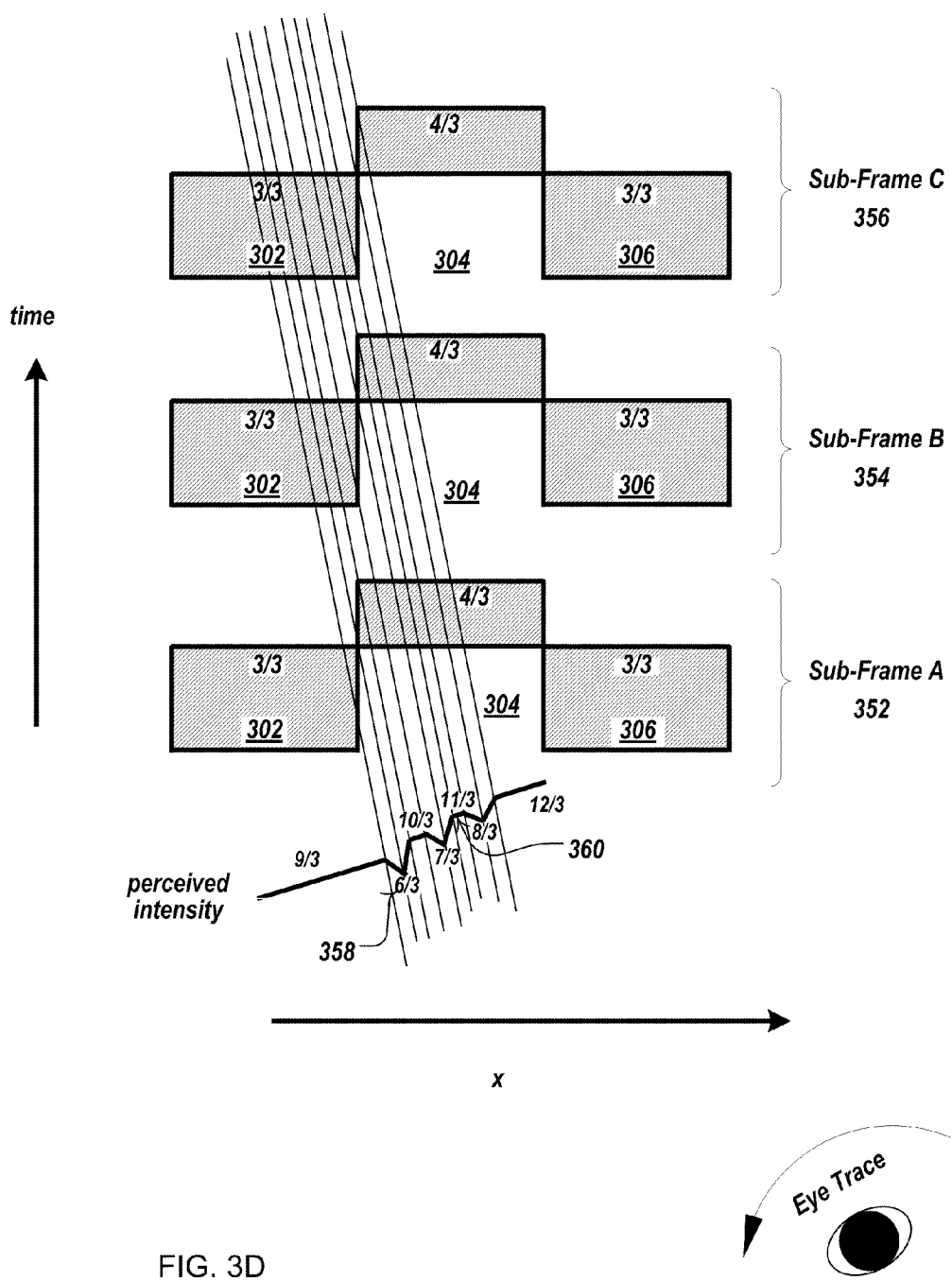

FIG. 3D illustrates an example of how using sub-frames (e.g., three repeating copies of a frame of an image) in place of each frame of an image can reduce the motion contour artifacts in an image. FIG. 3D illustrates three sub-frames of an image, sub-frame A 352, sub-frame B 354, and sub-frame C 356, that are displayed in sequence. When a viewer's eyes trace from right to left across the screen, the viewer will still see small dark shadows in the image (e.g., dark shadows 358 and 360 between region A 302 and region B 304), similar to the shadows perceived in the no sub-frame case illustrated in FIG. 3C. However, because each sub-frame in FIG. 3D is displayed for a fraction of the time that the frames shown in FIG. 3C are displayed, the magnitude of each shadow (both absolutely, and relative to the shadows around it) is decreased, and thus each shadow is less noticeable to a viewer's eye. In other words, the motion contour effects are averaged. For example, dark shadow 358 has a value of 6/3 because over time, the viewer perceives light being projected for sub-frames B and C 354 and 356, but not for sub-frame A 352 (3/3+3/3+0=6/3). As another example, dark shadow 360 has a value of 11/3 because over time, the viewer perceives light being projected for region 304 for sub-frames A 352 and B 354, but perceives the light being projected for region 302 for sub-frame A (3/3+4/3+4/3=11/3) (e.g., the light projected for region 304 for all of sub-frames A, B, and C 352, 354, and 356). Light shadows, for example, the shadows at the edge of region 304 and region 306 have similarly smaller magnitudes. Thus, displaying multiple sub-frames in place of a frame of an image reduces the motion contour effects.

Figure 4:
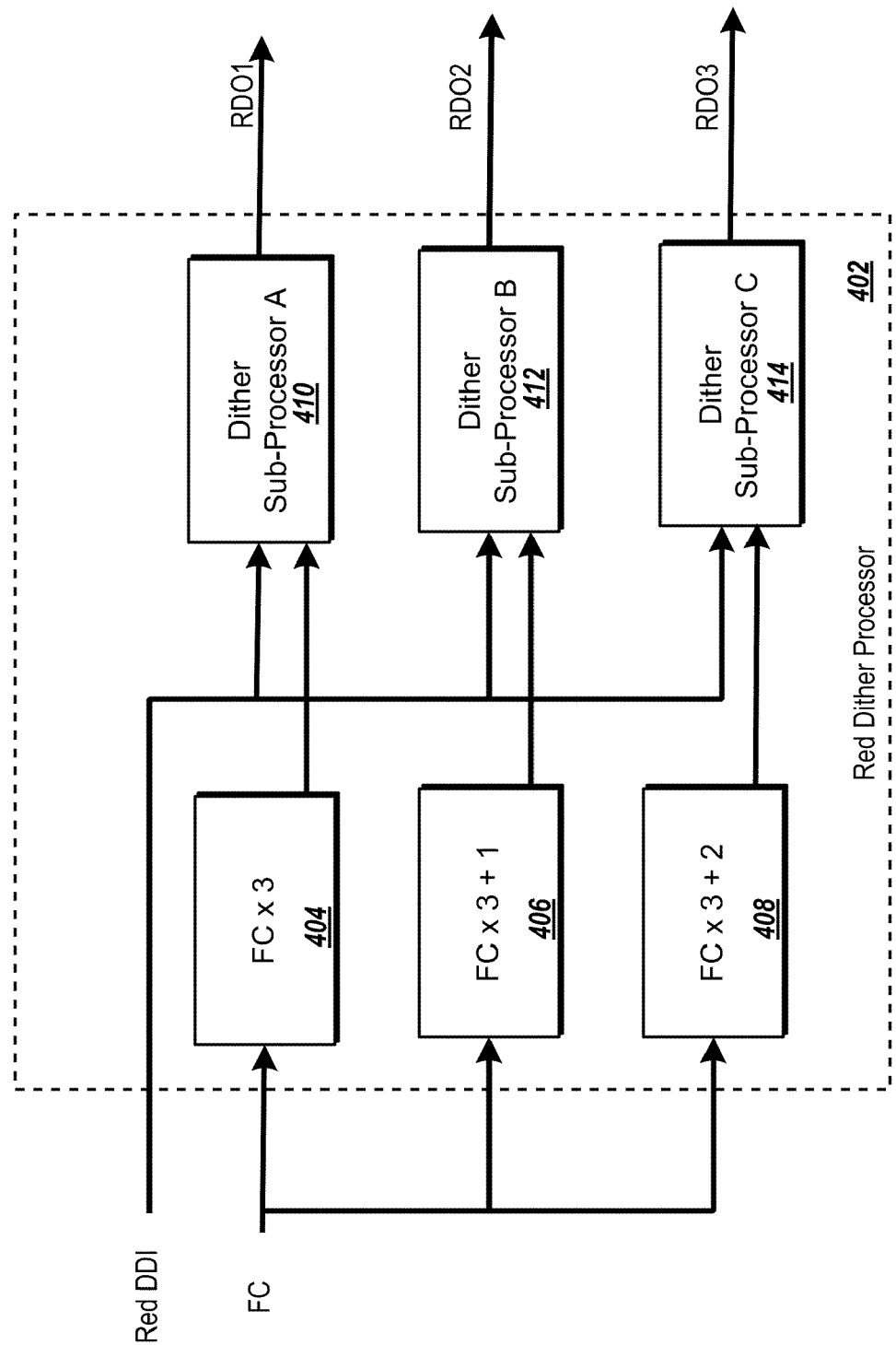
FIG. 4 illustrates a detailed view of a dither processor for the red color channel.

FIG. 4 illustrates a detailed view of a dither processor 402 for the red color channel. The red dither processor 402 receives pixel data corresponding to the red channel of a frame of the image (e.g., from a color lookup table) and receives a frame count for the frame. The frame count corresponds to a location in a sequence of dither patterns that are applied to the frames of the image.

The red dither processor 402 processes the current frame using a number of (i.e., three) dither sub-processors (dither sub-processor A 410, dither sub-processor B 412, and dither sub-processor C 414). Each dither sub-processor generates dithered sub-frame data corresponding to the frame of the image by applying a different dither pattern to the data for the frame. Each dither pattern is generated from a sub-frame count derived from the frame count. The red dither processor 402 processes each pixel of the frame in sequence, for example, as the system performs video display scanning. However, other processors are possible, for example, processors that process all (or a subset) of the pixels of a frame in parallel.

The red dither processor 402 includes multiple dither sub-processors, one for each sub-frame that is generated from a given frame. In FIG. 4, three sub-frames are generated for each frame, and thus the red dither processor 402 includes three dither sub-processors: dither sub-processor A 410, dither sub-processor B 412, and dither sub-processor C 414. Each dither sub-processor obtains a dither pattern for its corresponding sub-frame and applies the dither pattern to the frame. Each dither sub-processor A-C can generate a different dither pattern from a dither ordering table and a sub-frame count corresponding to the frame count for the image and the sub-frame for which data is being generated. For example, in FIG. 4, the sub-frame count for each sub-frame is calculated by multiplying the frame count by three (the number of sub-frames) and adding zero, one, or two to the result, depending on the sub-frame being generated. Dither sub-processor A 410 generates the dither pattern corresponding to the entry in the dither ordering table for the frame count multiplied by three, dither sub-processor B 412 generates the dither pattern corresponding to the entry in the dither ordering table for the frame count multiplied by three with one added to it, and dither sub-processor C 414 generates the dither pattern corresponding to the entry in the dither ordering table for the frame count multiplied by three, with two added to it. Each dither sub-processor then applies the appropriate dither pattern to the frame, resulting in three dithered sub-frames.

Each dither sub-processor A-C then outputs pixel data (RDO1, RDO2, RDO3) for its corresponding dithered sub-frame.

Figure 5:
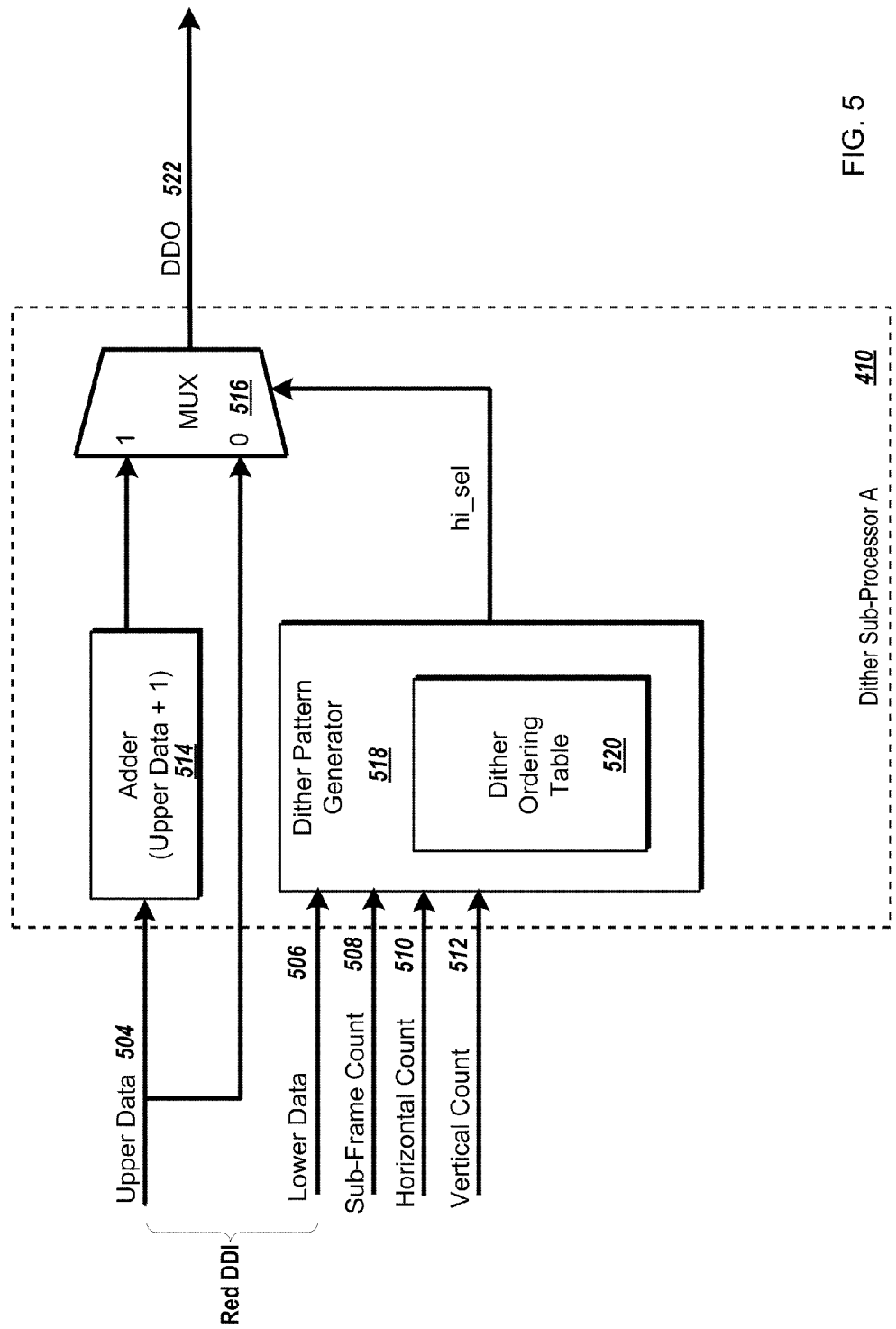
FIG. 5 illustrates an example dither sub-processor.

FIG. 5 illustrates an example dither sub-processor A 410. Dither sub-processor A 410 receives a number of inputs for a pixel of a frame of an image and a given color channel and generates pixel data for the color channel that corresponds to a dithered sub-frame of the image frame. The inputs can include red dither data input (red DDT) consisting of upper data 504 and lower data 506 (for example, from a color look-up table such as the color look-up table 108), a sub-frame count 508, a horizontal count 510, and a vertical count 512. The upper data and lower data correspond to pixel data for the pixel in the frame that is being processed. The upper data are the more significant bits of the pixel data and will be preserved during dithering, while the lower bits are less-significant bits that will be truncated as a result of the dithering. For example, the input data can consist of four bits of upper data and four bits of lower data, in which case the output data will be four bits, or the input data can consist of eight bits of upper data and eight bits of lower data, in which case the output will be eight bits. The sub-frame count 508 identifies which dither pattern should be applied to the sub-frame being generated. The sub-frame count can be calculated, for example, as described above with reference to FIG. 4. The horizontal count 510 and vertical count 512 specify the location that corresponds to the current pixel being processed within the dither pattern that is being applied.

An adder 514 adds one to the upper data 504. In some implementations, the adder 514 only adds one to the upper data when the upper data value is less than the maximum value possible for the number of bits used to represent the upper data (e.g., fifteen for four bits, thirty-one for five bits, etc.).

A multiplexer 516 in the dither sub-processor 410 receives the upper data 504 and the output of the adder 514. The multiplexer 516 selects between the two inputs based on a control signal (hi_sel) it receives from the dither pattern generator 518. The dither pattern generator 518 generates the control signal based on the horizontal count 510, the vertical count 512, the lower data 506, the sub-frame count 508, and a dither ordering table 520, for example, the dither ordering table 602 shown in FIG. 6. The dither ordering table 520 can be included in the dither pattern generator 518 or can be separate from the dither pattern generator 518. The dither pattern generator 518 generates a value (e.g., zero or one) corresponding to the location defined by the horizontal count 510 and the vertical count 512 in a dither pattern corresponding to the lower data 506, the sub-frame count 508, and a dither ordering table 520. The dither pattern generator 518 can generate just the value corresponding to the location in the pattern defined by the horizontal count 510 and the vertical count 512. Alternatively, the dither pattern generator 518 can obtain the entire pattern (for example, by retrieving it from memory, or generating it using parallel processors) and select the value corresponding to the location in the pattern defined by the horizontal count 510 and the vertical count 512.

The value identified by the dither pattern generator 518 (i.e., the control signal hi_sel) is then provided to the multiplexer. If the value is zero, the original upper data is output as the dithered data out (DDO) 522. If the value is one, the signal received from the adder 514 is output as the dithered data out 522.

Other implementations of the dither sub-processor are also possible. For example, the dither pattern can be retrieved from a sequence of pre-defined dither patterns stored in memory, such as one of the patterns in the sequences shown in FIG. 7, instead of being generated as needed. As another example, while FIG. 5 shows a hardware implementation of a dither sub-processor, the dither sub-processor can alternatively be implemented in software that causes a processor (e.g., a digital signal processor) to perform actions similar to those performed by the hardware.

Figure 6:
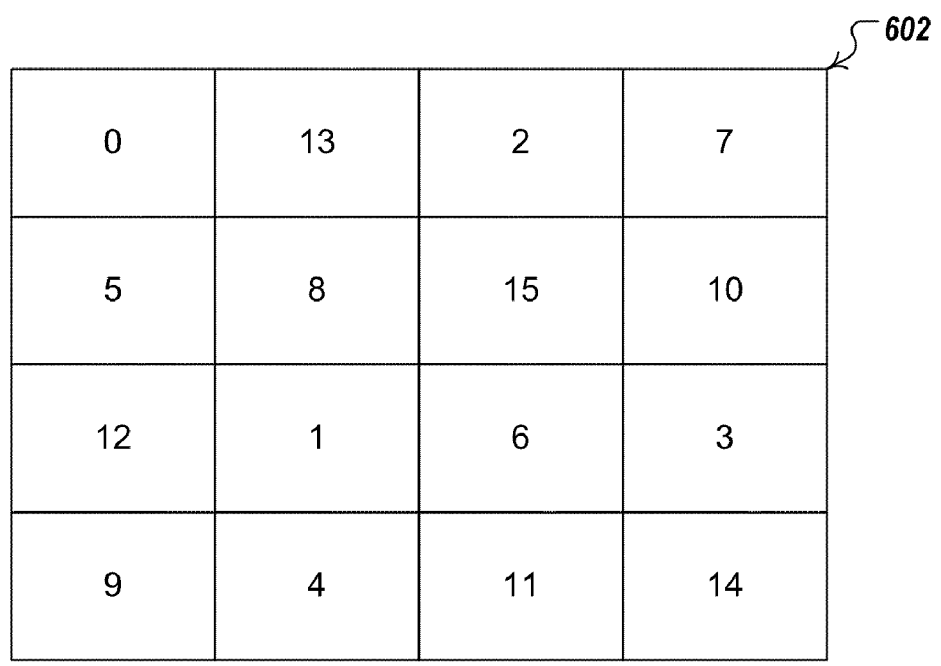
FIG. 6 illustrates an example four-by-four dither ordering table.

FIG. 6 illustrates an example four-by-four dither ordering table 602. The numbers in the cells of table 602 indicate how a dither pattern can be generated from a sub-frame count and the lower bit data for the sub-frame. Generally speaking, the size of the dither table corresponds to the number of lower data bits and is selected so that there is a cell in the table for every number that can be represented by the number of bits in the lower data. For example, when the number of lower data bits is four (and thus the lower data can represent $2^4=16$ different numbers), a four-by-four table (with sixteen cells) can be used; when the number of lower data bits is five, an eight-by-four table can be used; when the number of lower bits is six, an eight by eight table can be used; when the number of lower bits is seven, a sixteen-by-eight table can be used, and when the number of lower bits is eight, a sixteenby-sixteen table can be used. While FIG. 6 is one example of a dither ordering table 602, other dither ordering tables can be used.

Figure 7:
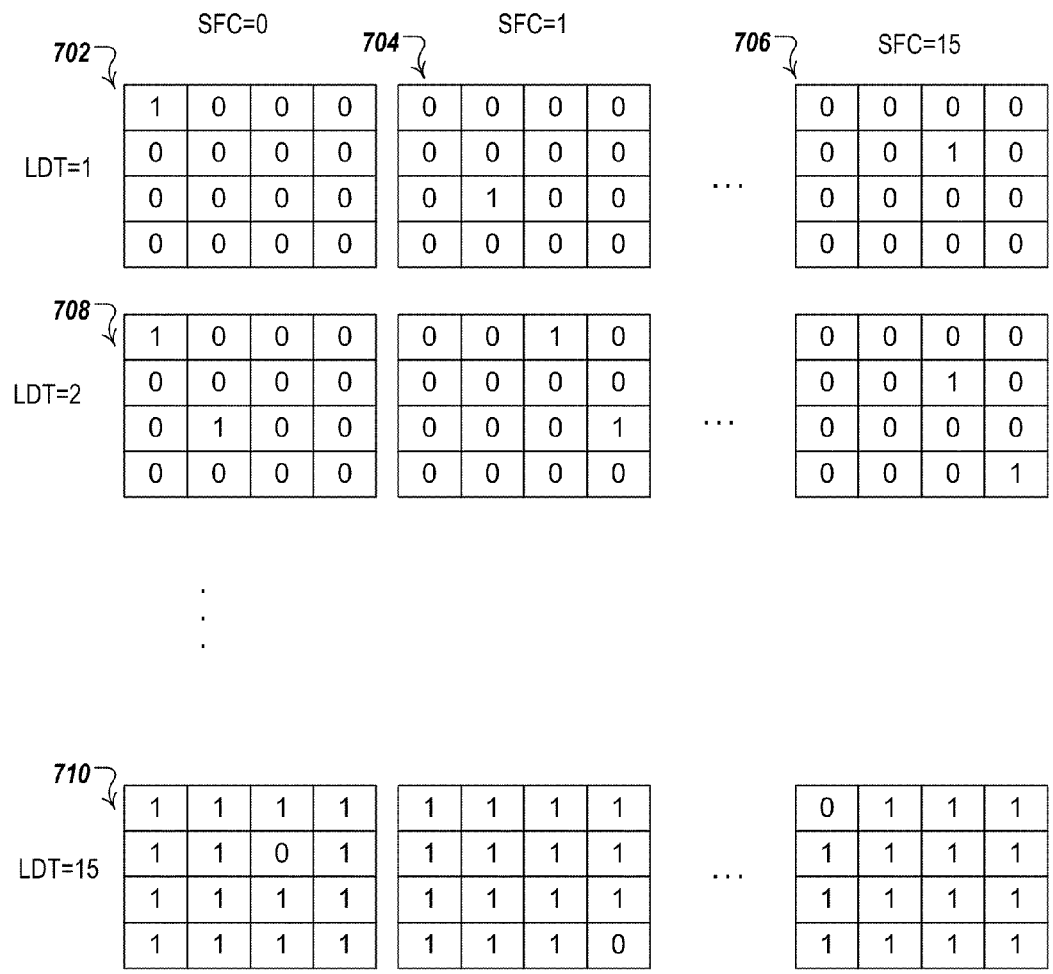
FIG. 7 illustrates an example of temporal and spatial constant dithering patterns that can be generated from a dither ordering table.

FIG. 7 illustrates an example of temporal and spatial constant dithering patterns that can be generated from the dither ordering table 602 illustrated in FIG. 6. The patterns are considered temporally and spatially constant because over the sequence of patterns, each location in the pattern will have a one the same number of times and a zero the same number of times. The number of ones and zeros to include in each pattern is determined from the lower data (LDT) of the pixel data—the higher the lower data, the more ones that will be in the pattern. In some implementations, the number of ones that are included in the pattern is the number represented by the lower data.

For example, when LDT=1, the dither pattern is generated by placing a one in the cell of the dither pattern corresponding to the number in the cell of the dither ordering table 602, and by placing zeroes in all other cells. For example, sub-frame count (SFC) zero is in the upper left hand corner of the table 602 (FIG. 6). Therefore, for LDT=1 and SFC=0, a one is in the upper left hand corner of the pattern 702 and zeroes are in all other cells of the pattern 702. Similarly, for LDT=1 and SFC=1, a one is in the second column and third row of the dither ordering table 602, and therefore the dither pattern 704 has a one in the cell in the second column and third row and zeros in all other cells. As yet another example, for LDT=1 and SFC=15, a fifteen is in the third column and second row of the dither ordering table 602, and therefore the dither pattern 706 has a one in the cell in the third column and second row, and zeroes in all other cells.

As another example, when LDT=2, the dither pattern is generated by placing two ones in each dither pattern, starting from locations zero and one in the dither ordering table 602 and iterating through the other locations in pairs of two. Similarly, when LDT=15, fifteen ones are placed in the dither pattern, starting from locations zero to fourteen in the dither ordering table 602, and iterating through the other locations.

The dither pattern generator can generate a value for a particular location in the dither pattern without generating the entire pattern. For example, if LDT=1, SFC=0, and the value in the upper left hand corner of the pattern (at horizontal count zero, vertical count zero) is desired, the value can be generated by locating the cell in the dither ordering table 602 corresponding to horizontal count zero, vertical count zero, retrieving the number from that cell (i.e., the number zero), and determining whether the dither pattern corresponding to LDT=1, SFC=0 should have a one or a zero at the location based on the retrieved number. When LDT=1 and SFC=0, the dither pattern has a one in the location numbered zero, and therefore, the value one is generated. This technique is described in more detail below with reference to FIGS. 8-12.

Figure 8:
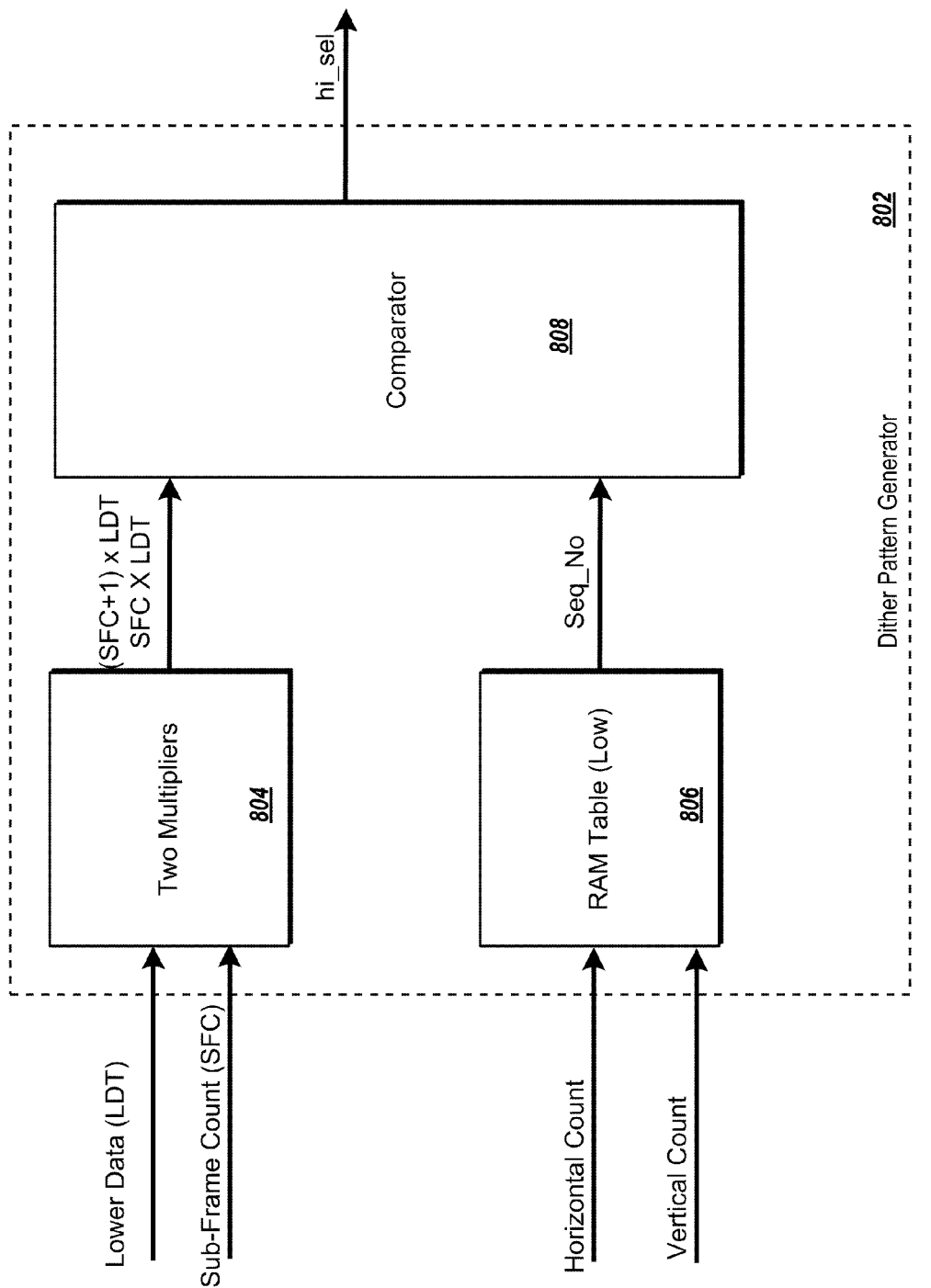
FIG. 8 illustrates an example dither pattern generator that generates a control signal for a given pixel.

FIG. 8 illustrates an example dither pattern generator 802 that generates the control signal hi_sel for a given pixel. The dither pattern generator 802 can generate the control signal in real time pixel clock speed. The dither pattern generator 802 can be used, for example, when the lower data and sub-frame count are each four bits.

The dither pattern generator 802 consists of two multipliers 804, a RAM table 806 (e.g., a dither ordering table, such as the dither ordering table 602), and a comparator 808. The two multipliers 804 receive the lower data and the sub-frame count and calculate two values, the sub-frame count multiplied by the lower data, and the sub-frame count plus one multiplied by the lower data. In some implementations, the two multipliers 804 output the products modulo two raised to the number of bits of the lower data. For example, if the lower data is four bits, the two multipliers 804 can output the products modulo sixteen ($2^4$). The dither pattern generator 802 provides these two values to the comparator 808, along with the value, Seq_No, stored in the RAM table at the location specified by the horizontal count and vertical count. The comparator then uses internal logic to determine whether to output a zero or a one.

Figure 9:
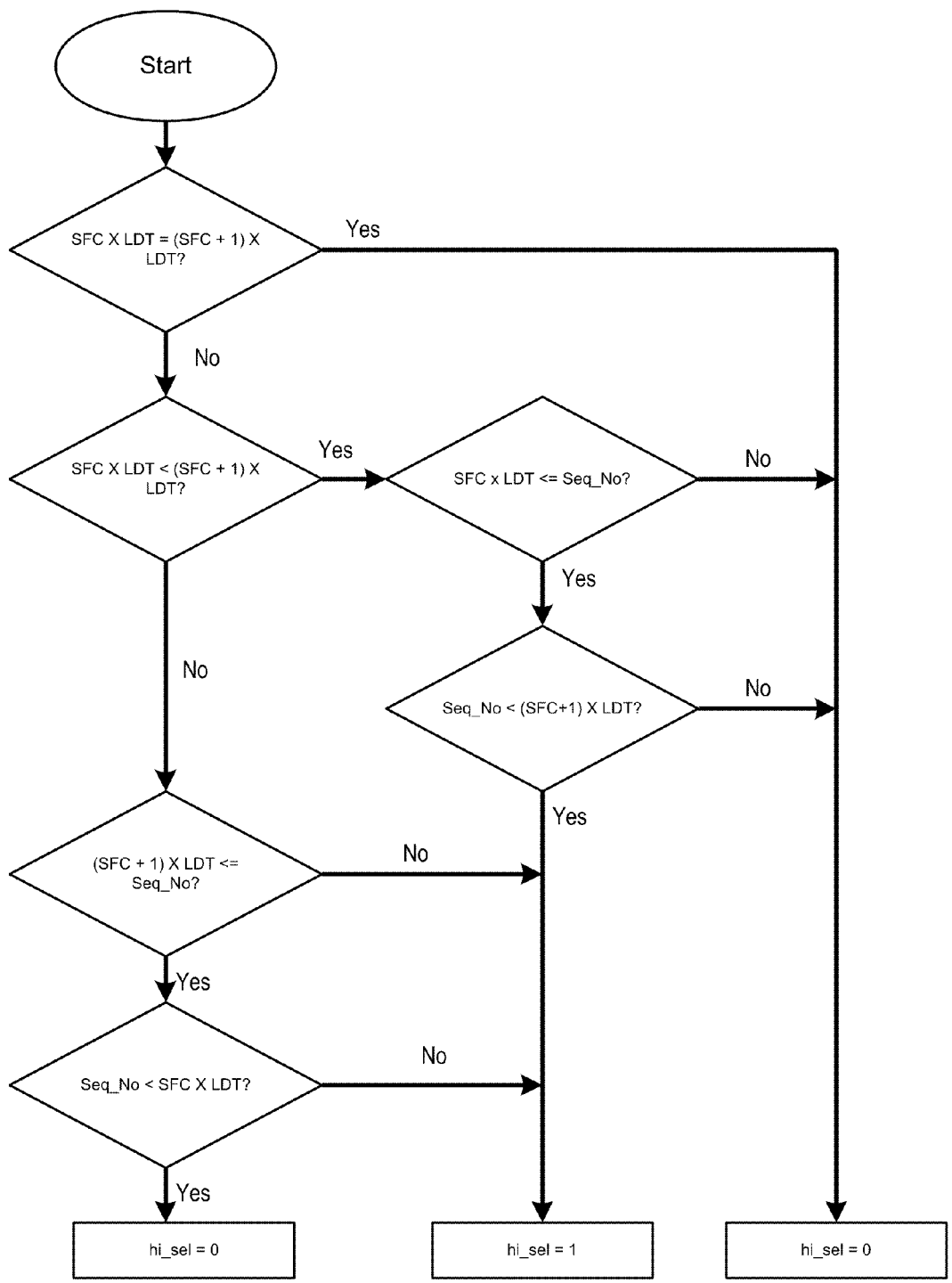
FIG. 9 illustrates example logic applied by a comparator to determine a value for the control signal.

FIG. 9 is a flow chart illustrating an example of the logic applied by the comparator 808 to determine the value for the control signal hi_sel. The comparator executes a series of comparisons as indicated by FIG. 9, and chooses zero or one based on the outcome of the comparisons.

Figure 10:
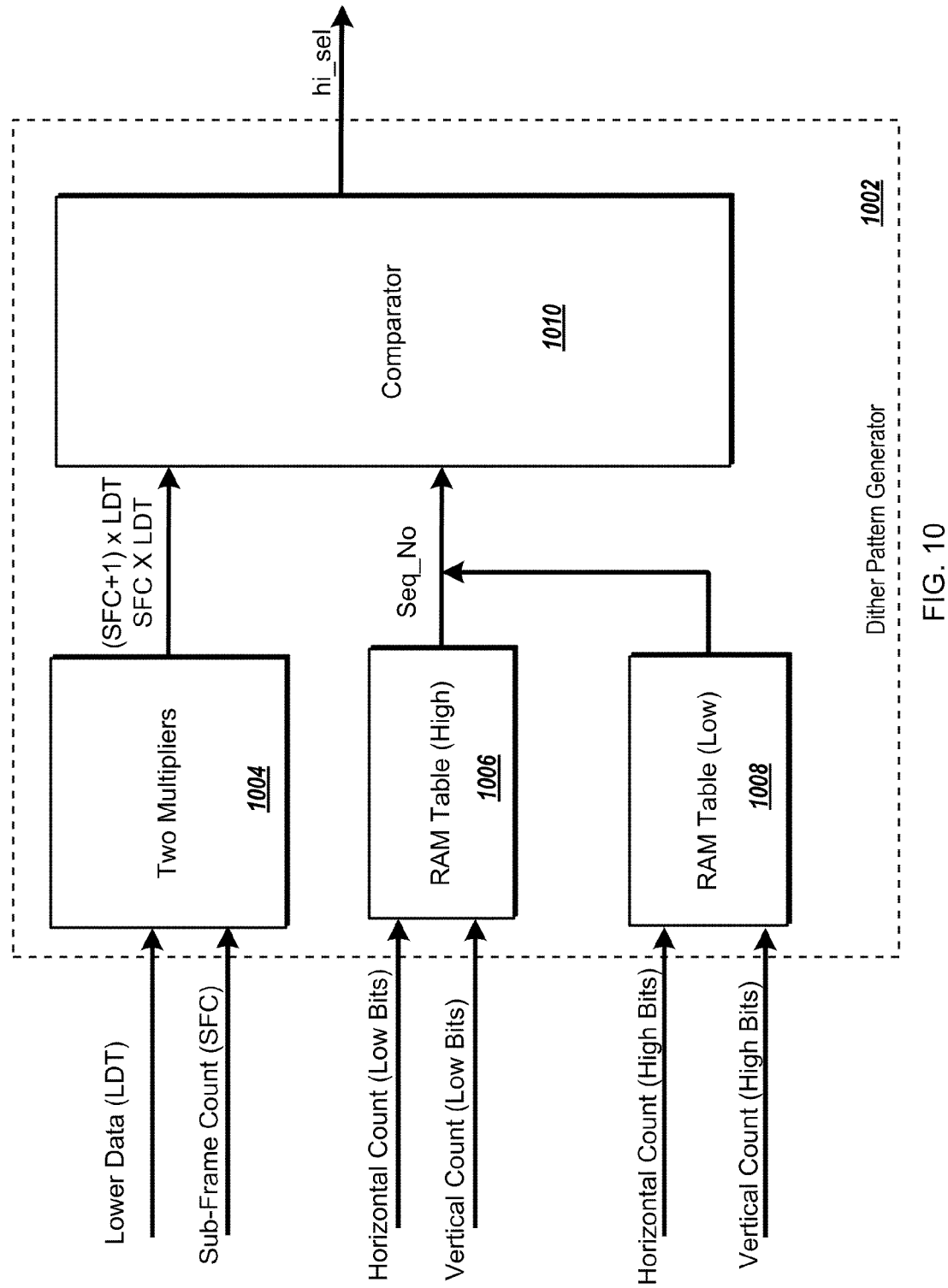
FIG. 10 illustrates an example dither pattern generator that can be used when the lower data and the sub-frame count are each eight bits.

FIG. 10 illustrates an example dither pattern generator 1002 that can be used when the lower data and the sub-frame count are each eight bits. The dither pattern generator 1002 is similar to the dither pattern generator 802, except that it includes two RAM tables, one corresponding to the lower bits of the horizontal and vertical counts (RAM Table (High) 1006) and one corresponding to the higher bits of the horizontal and vertical counts (RAM Table (Low) 1008). The RAM Table (Low) 1008 can be, for example, the dither ordering table 602 described above with reference to FIG. 6. The RAM Table (High) 1006 is similar dither ordering table. The system generates the low four bits of Seq_No (e.g., bits 3 to 0 of Seq_No) from RAM Table (Low) 1008 and generates the high four bits of Seq_No (e.g., bits 7 to 4 of Seq_No) from RAM Table (High) 1006. Addressing RAM Table (High) 1006 and RAM Table (Low) 1008 separately allows the system to achieve the effect of a sixteen-by-sixteen dither ordering table with only two four-by-four dither ordering tables.

FIG. 11 illustrates two examples of the RAM Table (High), table 1102 and table 1104.

Returning to FIG. 10, the dither pattern generator 1002 provides the values retrieved from the RAM Table (High) and RAM Table (Low) and the outputs from the two multipliers 1004 to the comparator 1010 which outputs zero or one based on the inputs. For example, the comparator 1010 can use the logic illustrated by the flow chart in FIG. 9 to determine the appropriate output.

Figure 12:
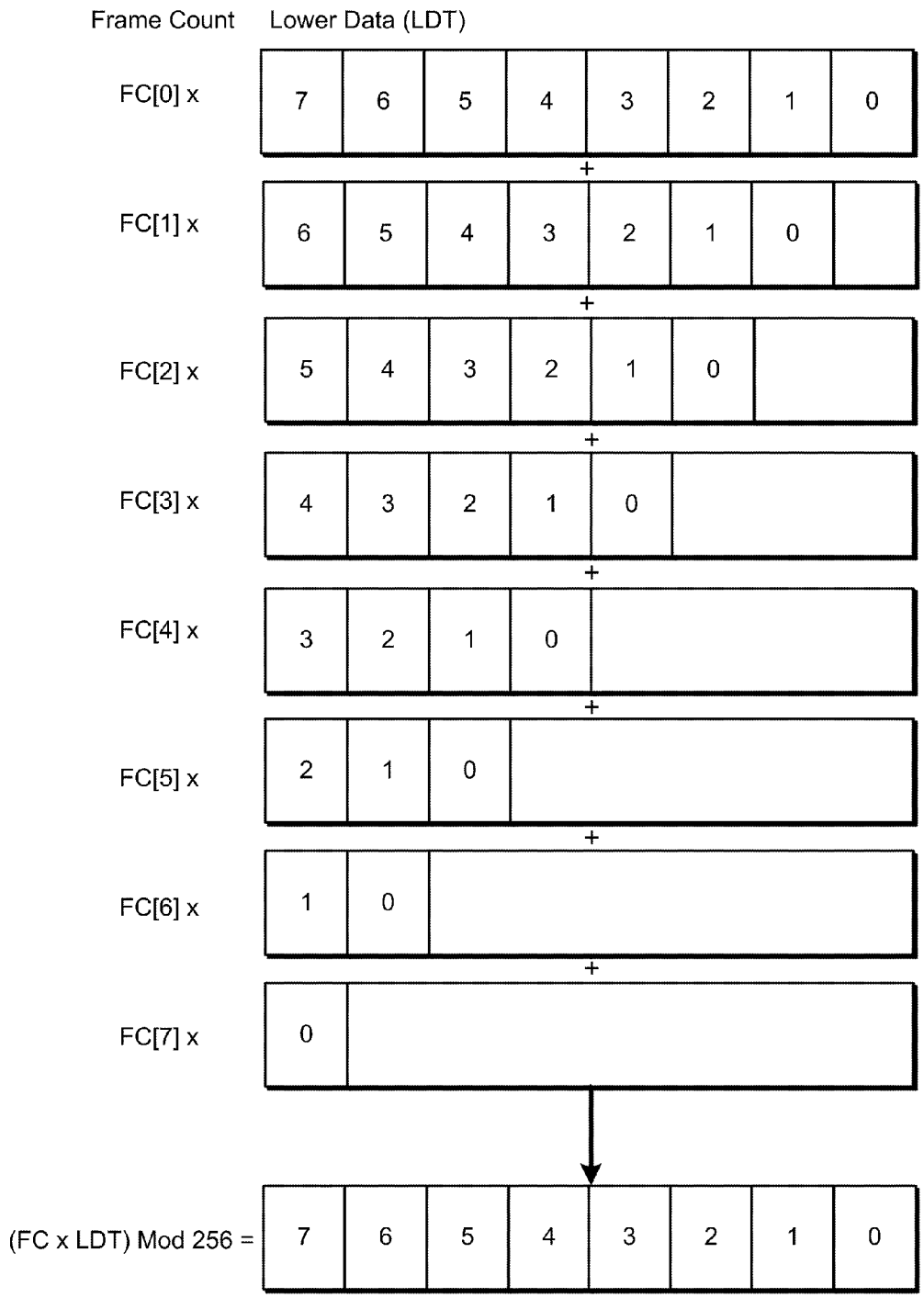
FIG. 12 illustrates an example optimization for each of the two multipliers shown in FIG. 10.

FIG. 12 illustrates an example optimization for each of the two multipliers 1004 shown in FIG. 10. Traditional multipliers that multiply two eight bit numbers require sixteen bits of output. However, the dither algorithm only requires the lower eight bits of the product. Therefore, the multipliers do not have to multiply all eight bits of the sub-frame count by all eight bits of the lower data, and can do the multiplication using only eight bits of output. The multiplier multiplying LDT×SFC multiplies the least significant bit of the sub-frame count (e.g., bit 0) by all of the bits of the lower data, multiplies the next least significant bit of the sub-frame count (e.g., bit 1) by only the seven least significant bits of the lower data (i.e., the lower data shifted by one bit), multiplies the next least significant bit of the sub-frame count (e.g., bit 2) by only the six least significant bits of the lower data (i.e., the lower data shifted by two bits), and so on. As shown in FIG. 12, the results of the multiplications are added together to get the final result, which is equal to the sub-frame count multiplied by the lower data, modulo 256. The multiplier calculating (SFC+1)×LDT performs similar operations, but uses SFC+1 in place of the sub-frame count.

While FIG. 12 illustrates an optimization for a multiplier that multiplies two eight bit numbers, a similar optimization can be used for multipliers that multiply numbers of other sizes, for example, the two multipliers 804, described above with reference to FIG. 8, that multiply two four bit numbers.

Figure 13:
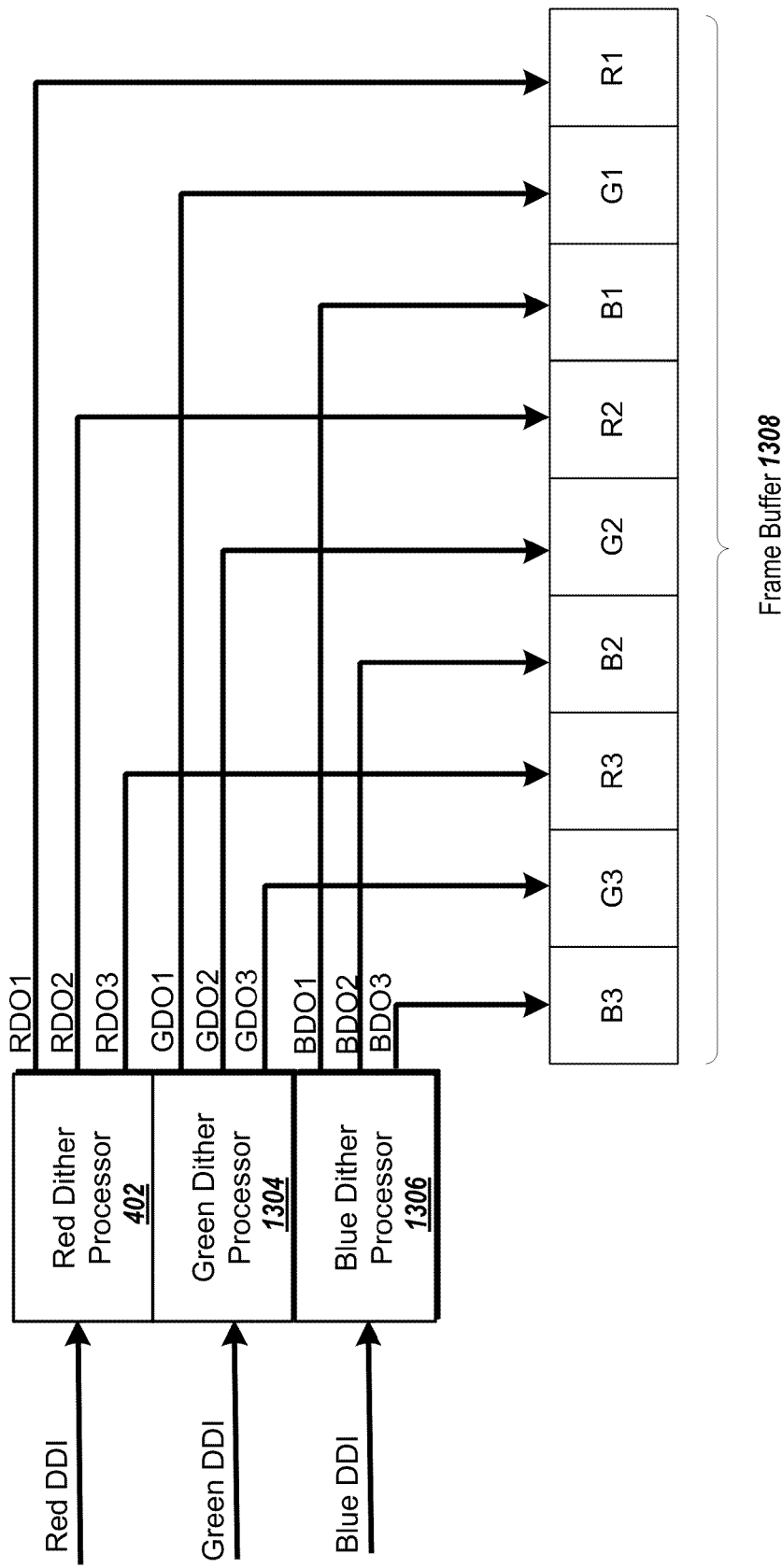
FIG. 13 illustrates an example of dither processors for each of the color channels of an image and the output from the dither processors.

FIG. 13 illustrates an example of dither processors for each of the color channels of an image (red, green, and blue) and the output from those dither processors.

Each color channel has a respective dither processor (i.e., the red dither processor 402, the green dither processor 1304, and the blue dither processor 1306). Each dither processor receives data input corresponding to the pixel data for its respective channel, generates multiple dithered sub-frames, for example, as described above with reference to FIG. 4. Each color channel dither processor outputs pixel data for each sub-frame of the frame (e.g., RDO1, RDO2, RDO3, GDO1, GDO2, GDO3 and BDO1, BDO2, BDO3). The sub-frame data can then be ordered by sub-frame in a frame buffer 1308. For example, the blue, green, and red output data for sub-frame three (BDO3, GDO3, RDO3) is grouped together in the frame buffer 1308, and the blue, green, and red output data for sub-frame one (BDO1, GDO1, RDO1) is grouped together in the frame buffer 1308.

Figure 14:
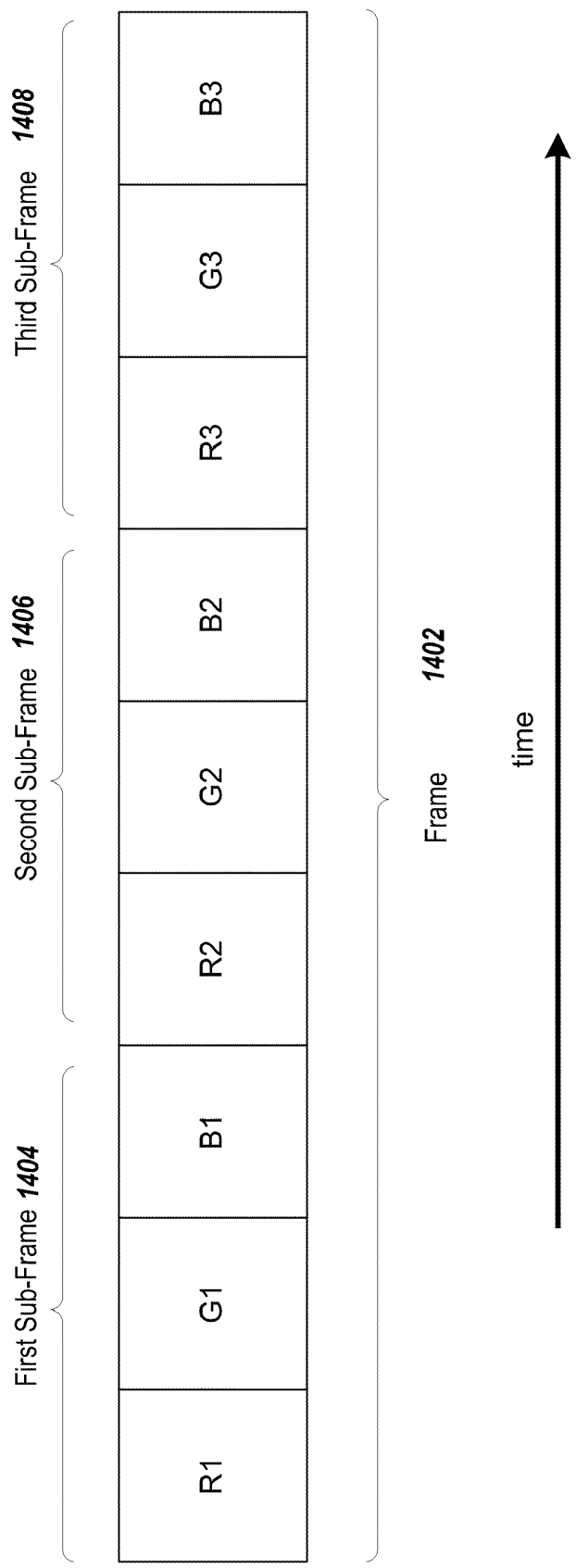
FIG. 14 illustrates an example frame buffer with the data labeled by sub-frame.

FIG. 14 illustrates an example frame buffer 1402 with the data labeled by sub-frame. The first three entries 1404 in the frame buffer correspond to the first sub-frame, the second three entries 1406 in the frame buffer correspond to the second sub-frame, and the last three entries 1408 in the frame buffer correspond to the third sub-frame. The data in the frame buffer is provided to a display device which displays each sub-frame in a fraction (i.e., 1/number of sub-frames) of the time that it would normally display the frame to which the sub-frames correspond. For example, if the frames are usually displayed at a frequency of 60 Hertz, each sub-frame is displayed at a frequency of 180 Hertz, so that the overall frequency for the frame remains at 60 Hertz.

Figure 15:
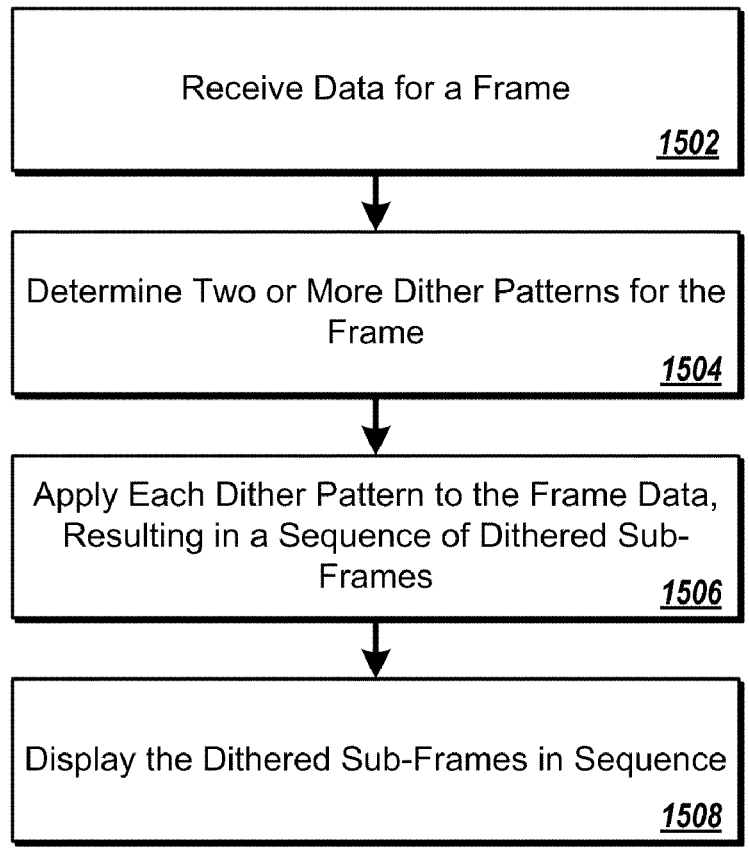
FIG. 15 illustrates an example method for displaying a frame of a digital image by displaying dithered sub-frames corresponding to the frame.

FIG. 15 illustrates an example method 1500 for displaying a frame of a digital image by displaying dithered sub-frames corresponding to the frame. For convenience, the example method 1500 will be described in reference to an image processor that performs the method 1500. The image processor can be, for example, the display system 100, a sub-system of the display system 100, such as the dither processor 110, or another display system.

The image processor receives data for a frame (step 1502), for example, from a video data source 102. In some implementations, the image processor can process the frame data using one or more of a video decoder, a video data processor, and a color lookup table.

The image processor determines two or more dither patterns for the frame (step 1504). The image processor can determine the dither patterns, for example, by determining a dither pattern value for each pixel in the frame, as described above with reference to FIGS. 5-12. In some implementations, the dither patterns correspond to a frame count for the frame and a dithered sub-frame being generated for the frame. In some implementations, the pre-defined dither patterns are generated from a dither ordering table, for example, as shown in FIG. 6. In alternative implementations, the pre-defined dither patterns are selected from a series of dither patterns stored in memory, for example, the series of patterns shown in FIG. 7.

The image processor applies each dither pattern to the frame, resulting in a sequence of dithered sub-frames (step 1506). In some implementations, the dither pattern value for each pixel is applied by a number of dither sub-processors each corresponding to a single dithered sub-frame, for example, as described above with reference to FIG. 5. In alternative implementations, a single dither sub-processor can generate multiple sub-frames for example, by applying the different dither patterns to the frame in sequence.

The image processor then displays the dithered sub-frames in sequence (step 1508), for example, by storing the dithered sub-frame data in a frame buffer, generating bit plane data from the frame buffer using a pulse width modulator, and providing the bit plane data to a display device. The sequence of dithered sub-frames is displayed in place of the frame.

In addition to reducing motion contour and jitter, the sub-frame dithering described above with reference to FIGS. 1-13 can help reduce color break-up in an image, as described above with reference to FIG. 2, because the use of sub-frames increases the frequency with which colors are displayed, thus decreasing the period over which any one color is displayed. Color break-up can be further reduced by grouping bits of pixel data and reordering the pixel data to intersperse sub-groups of pixel data corresponding to different color channels, further reducing the period over which any color is displayed. Techniques for reordering pixel data are discussed below with reference to FIGS. 16-21. These techniques can be used as a separate optimization, for example, by an image processor that does not perform sub-frame dithering, or in combination with the generation of sub-frames described above.

Figure 16:
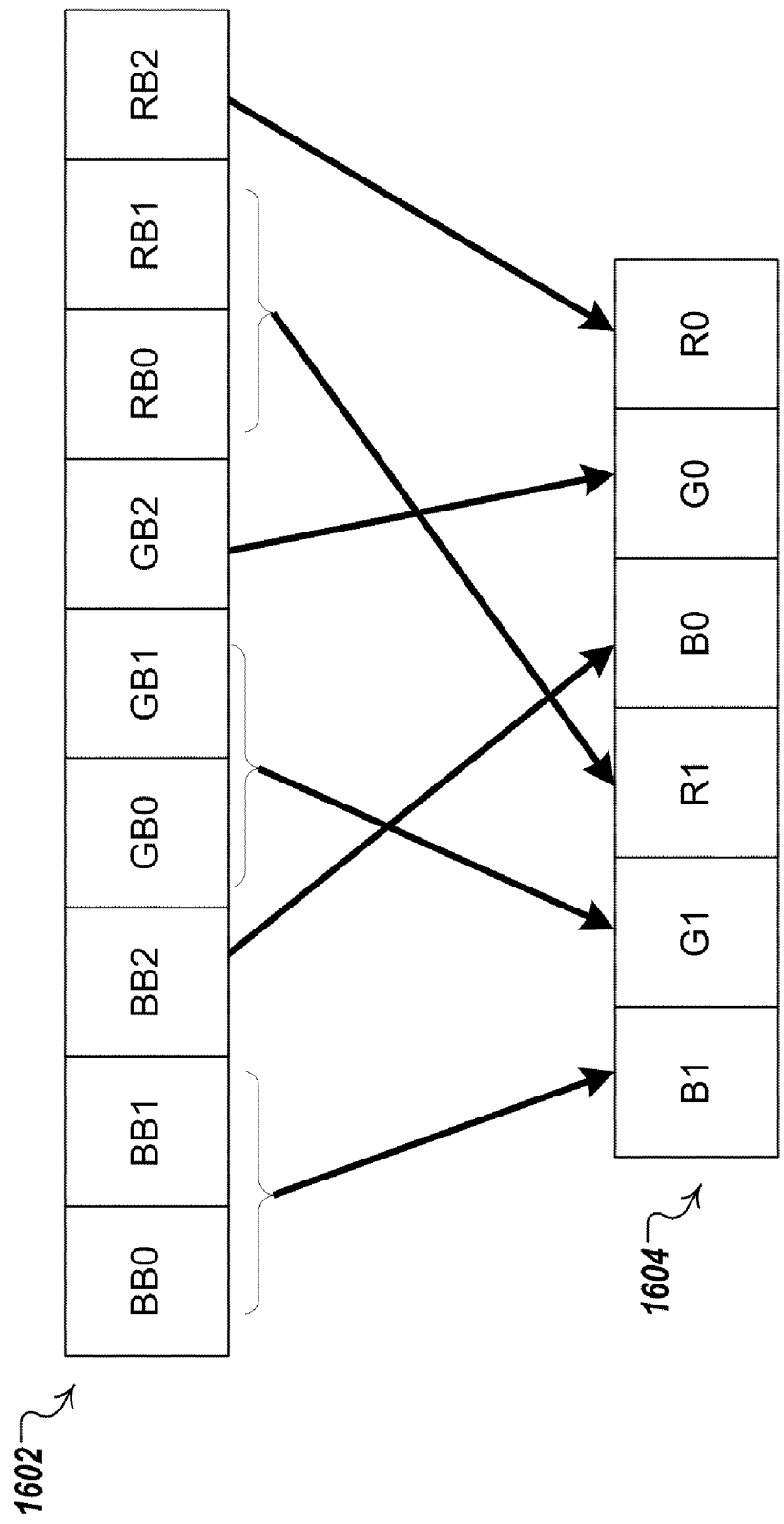
FIG. 16 illustrates an example of reordering and grouping pixel data to reduce color break-up effects.

FIG. 16 illustrates an example of reordering and grouping pixel data to reduce color break-up. Generally speaking, pixel data is a series of bits that describes an intensity value for a given color channel and a given pixel. The bits are ordered based on their significance (e.g., from most significant to least significant or from least significant to most significant). Each bit corresponds to a different bit plane for a frame of the image.

Typical display systems project light corresponding to each pixel in the pixel data for a given color channel in turn. For example, a typical display system displays a pixel according to a frame buffer such as the frame buffer 1602 that stores the three red bits that are the pixel data for the red channel (RB0, RB1, RB2) together, stores the three green bits that are the pixel data for the green channel (GB0, GB1, GB2) together, and stores the three blue bits that are the pixel data for the blue channel (BB0, BB1, and BB2) together. The system retrieves data from the frame buffer in sequence, resulting in the display of light corresponding to all of the red bits, then all of the green bits, and then all of the blue bits.

The display of light corresponding to all the red bits, all the green bits, and all the blue bits increases the color break-up effect by causing relatively long flashes of red, green, and blue light, that can more easily be detected by the human eye. This effect can be reduced by separating the display of the bits of one color channel with the bits of another color channel, for example, by identifying sub-groups for the bits of the pixel data (each sub-group including one or more bits) and ordering the pixel data based on sub-group, not just color channel.

For example, in FIG. 16, the system groups bits BB0 and BB1 into sub-group B1, bit BB2 into sub-group B0, bits GB0 and GB1 into sub-group G1, and so on. The system then stores the pixel data for each sub-group together in the grouped frame buffer 1604. For example, the pixel data for sub-group 1 (B1, G1, and R1) are stored together in the grouped frame buffer 1604. The system can then provide bit plane data from the grouped frame buffer to the display device, which will display parts of the pixel data for each color channel in sequence. Displaying each color for a shorter time reduces the color break-up effect.

Alternatively, the system can store the data in the traditional order (e.g., as shown in the frame buffer 1602) and provide the data to the display device in the order illustrated in the grouped frame buffer 1604. For example, a pulse width modulator can reorder the data as appropriate.

While FIG. 16 illustrates an example grouping and reordering of pixel data, other groupings and ordering of the data can also be used. In some implementations, the groupings are chosen to attempt to equalize the amount of time light corresponding to each group is displayed.

Figure 17:
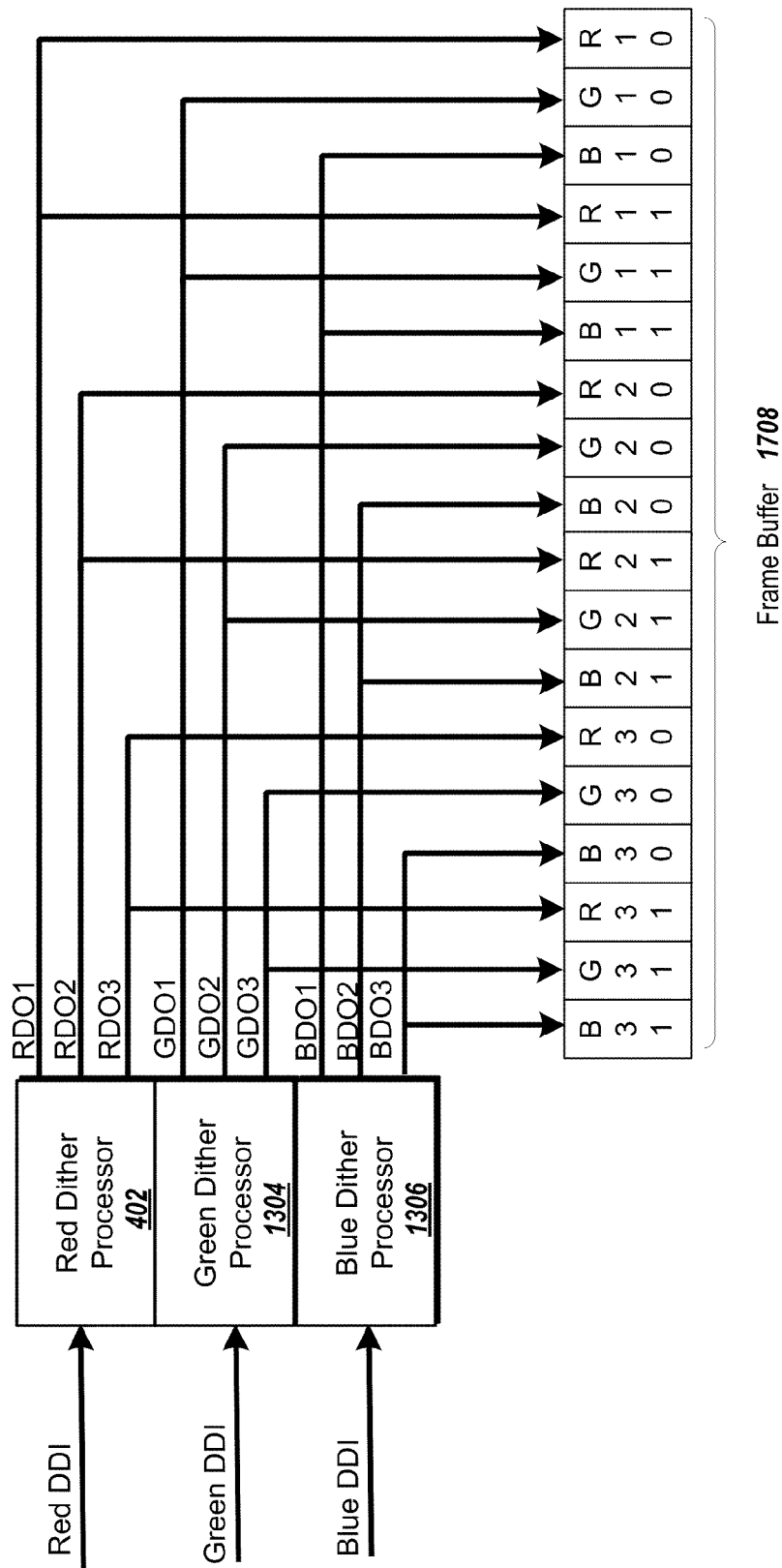
FIG. 17 illustrates an example of the output from the dither processors of FIG. 8, grouped according to the grouping illustrated in FIG. 16.

FIG. 17 illustrates an example of output from the dither processors of FIG. 13, grouped according to the grouping illustrated in FIG. 16.

In contrast to the frame buffer 1308 shown in FIG. 13, the grouped frame buffer 1708 in FIG. 17 stores grouped pixel data for each color channel. For example, the system splits the data output for the first red sub-frame RDO1 between R11 and R10 (sub-groups corresponding to R1 and R0 in the example shown in FIG. 16), and the system splits the data output for the third green sub-frame GDO3 between G31 and G30 (corresponding to G1 and G0 in the example shown in FIG. 16). The pixel data in the grouped frame buffer 1708 is ordered based on sub-frame and sub-group within the sub-frame. While FIG. 17 shows data that has been stored in a new order in the frame buffer, the same effect can be achieved by storing the data in the frame buffer 1308 shown in FIG. 13, but providing the data to the display device according to the order shown in the grouped frame buffer 1708. For example, a pulse width modulator can reorder the data as appropriate.

Figure 18:
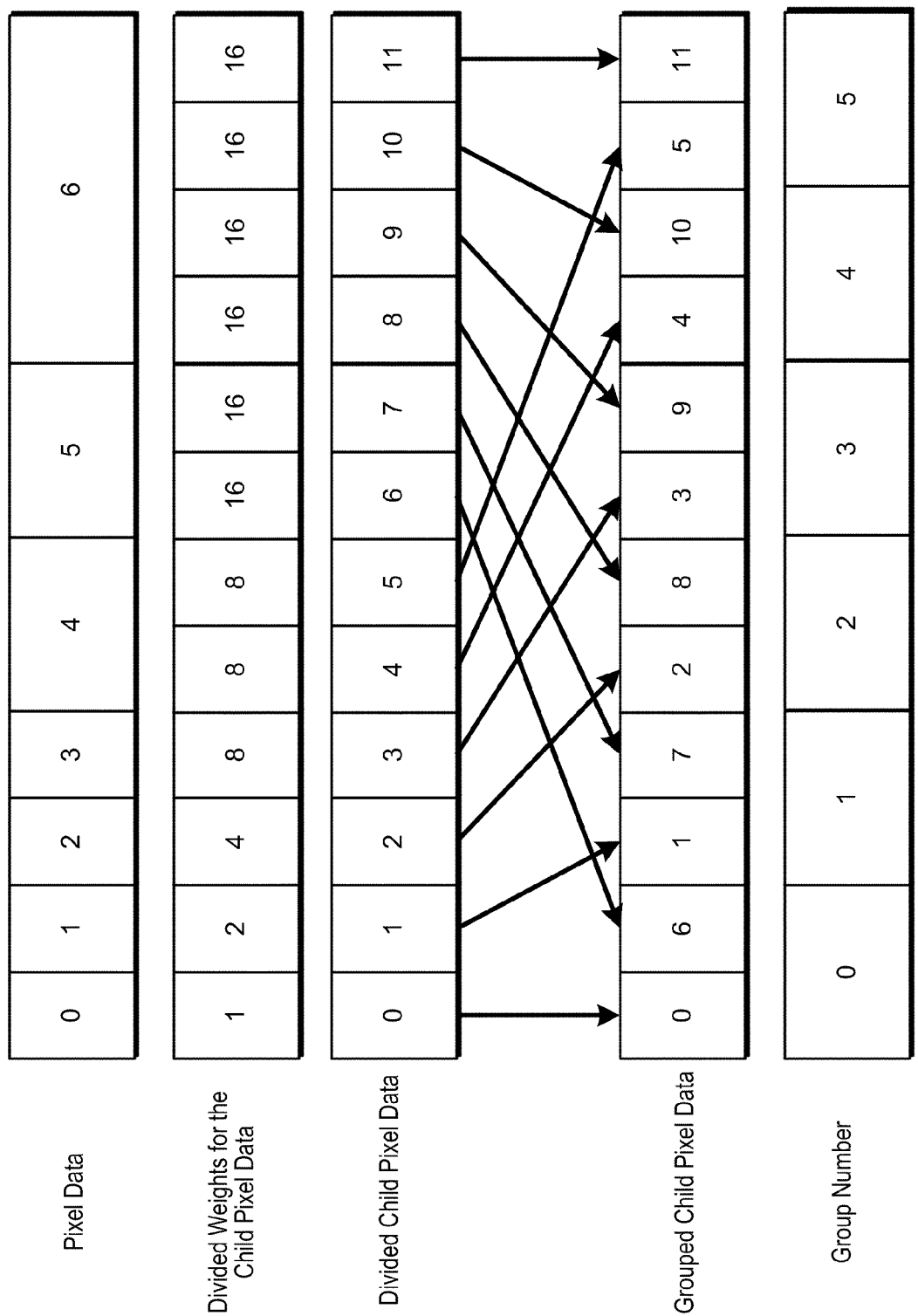
FIG. 18 illustrates an example of dividing weighted bits of pixel data into multiple bits before grouping the pixel data.

FIG. 18 illustrates an example of dividing weighted bits of pixel data into multiple bits before grouping the pixel data.

Generally speaking, a bit of pixel data is weighted if it corresponds to a weighted bit plane, for example, a binary weighted bit plane. Each bit in the pixel data shown in FIG. 18 corresponds to a bit plane in a sequence of binary weighted bit planes and has a weight corresponding to the weight of the bit plane. Pixel data bit 0 corresponds to a bit plane having a weight of one and thus has a weight of one; pixel data bit 1 has a weight of two; pixel data bit 2 has a weight of four; pixel data bit 3 has a weight of eight; pixel data bit 4 has a weight of sixteen; pixel data bit 5 has a weight of thirty-two; and pixel data bit 6 has a weight of sixty-four.

The effect that the grouping illustrated in FIGS. 16 and 17 has on color break-up is limited by the weights assigned to the bits. Red, green, and blue light will always be displayed for at least a period corresponding to the weight of the most significant bit. However, if the bits are divided into multiple divided bits before they are grouped, the light can be displayed for shorter periods of time and the color break-up can be further reduced.

As shown in FIG. 18, the system can divide the more significant bits of pixel data (e.g., bits 4-6) into child bits. For example, pixel data bit 4 is divided into two child pixel data bits (child bits 4 and 5) and pixel data bit 6 is divided into four child bits (child bits 8-11). Less significant bits of pixel data are not divided. While FIG. 18 illustrates only dividing more significant bits, in alternative implementations, other bits are divided. In some implementations, a bit must have a weight of at least one in order to be divided.

The system then calculates a divided weight for each of the child bits, for example, by dividing the weight of the parent pixel data bit that a child bit corresponds to by the total number of child bits for the parent bit. Other algorithms for calculating the divided weight can also be used, provided that the divided weights of all of the divided bits for a given parent bit sum to the undivided weight of the parent bit.

Once the system has divided the pixel data and determined the divided weights for each divided bit, the system groups the divided pixel data. Various methods of grouping can be used. In some implementations, bits with higher weights are grouped with bits with lower weights, to approximately equalize the weight assigned to each group. For example, in FIG. 18, less significant bits are grouped with more significant bits; specifically, bits that are separated by half of the total number of divided bits are grouped together (e.g., divided bits 0 and 6 are grouped together into group 0, and divided bits 2 and 8 are grouped together into group 2). However, other grouping algorithms can also be used, for example, the grouping described above with reference to FIG. 16. In some implementations, at least one of the groups is made up single bit (or a single divided bit).

Figure 19:
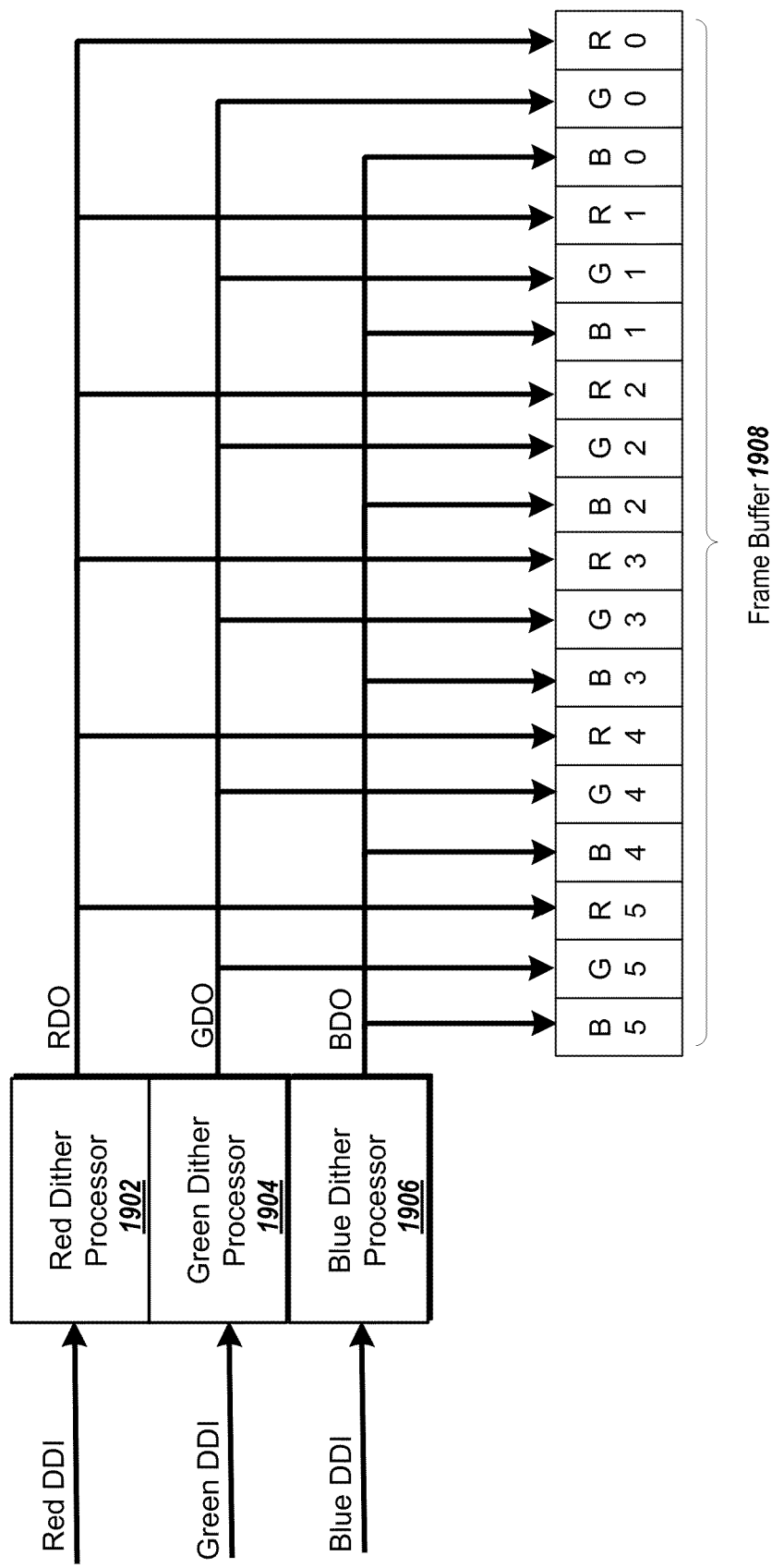
FIG. 19 illustrates an example of grouping output from red, green, and blue dither processors according to the grouping illustrated in FIG. 18.

FIG. 19 illustrates an example of grouping output from red, green, and blue dither processors according to the grouping described above with reference to FIG. 18.

As shown in FIG. 19, a red dither processor 1902, a green dither processor 1904, and a blue dither processor 1906 each take respective data input for a given frame and generate data output for a given frame. The system divides and groups the output from each dither processor using the algorithm described above with reference to FIG. 18, and stores each resulting sub-group of pixel data in the appropriate place in the frame buffer. For example, the output from the red dither processor 1902 (RDO) is divided into six sub-groups, R5, R4, R3, R2, R1, and R0, and each sub-group is stored in the frame buffer 1908 with the corresponding sub-group output from the green dither processor 1904 and the blue dither processor 1906. The dither processors can be conventional dither processors, or multiple sub-frame dither processors as described above. The data output from each dither processor is divided and grouped using the algorithm described above with reference to FIG. 18. Pixel data for each color channel and each sub-group are then stored together in the frame buffer 1908. The data in the frame buffer is used to generate bit plane data for use by a display device.

While FIG. 19 shows data that has been stored in a new order in the frame buffer, the same effect can be achieved by storing the data in a traditional frame buffer and accessing the bits of the data in the frame buffer in the new order (including, each time a child bit appears in the order, retrieving the divided weight for the child bit and the value for the parent bit).

Figure 20:
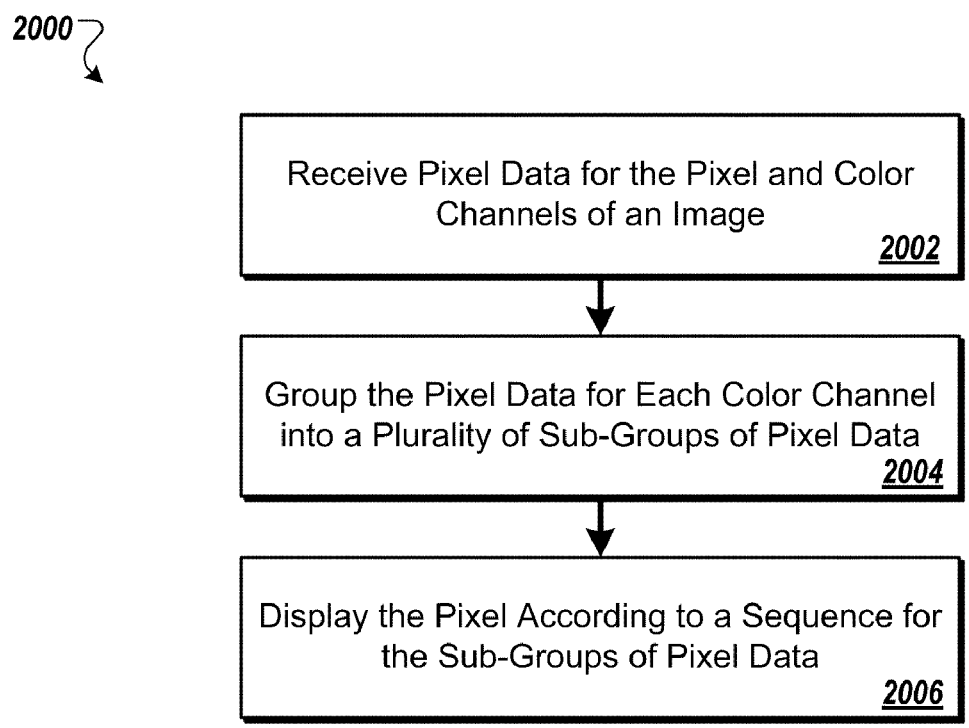
FIG. 20 illustrates an example method for grouping pixel data into sub-groups and re-ordering the pixel data.

FIG. 20 illustrates an example method 2000 for grouping pixel data into sub-groups and re-ordering the pixel data. For convenience, the example method 2000 will be described in reference to a system that performs the method 2000. The system can be, for example, the display system 100, or another display system.

The system receives pixel data for the pixel and the color channels of the image (step 2002). The pixel data can be received, for example, from a dither processor corresponding to each color channel, as described above with reference to FIGS. 17 and 19. The pixel data can have various numbers of bits, for example, four, five, or six bits.

The system groups the pixel data for each color channel into sub-groups of pixel data (step 2004). Each sub-group includes one or more bits of pixel data. Various grouping techniques can be used, for example, the algorithm described above with reference to FIG. 16. In some implementations, the bits of the pixel data are divided before they are grouped, for example, as described above with reference to FIG. 18, by dividing the bits, generating a new order for the plurality of bits, and grouping the bits according to the new order.

The system displays the pixel according to a sequence for the sub-groups of pixel data (step 2006). The sequence separates each pair of sub-groups for a given color channel by at least one sub-group for another color channel, for example, as described above with reference to FIG. 16. The sequence can group sub-groups for the color channels based on their subgroup, for example, as described above with reference to FIGS. 17 and 19.

The system displays the pixel by generating bit plane data from the sequence of grouped pixel data and provides the bit plane data to a display device. In some implementations, the system displays the pixel by retrieving pixel data in sequence from a frame buffer where the bits have already been grouped. In alternative implementations, the system displays the pixel by retrieving pixel data from a traditional frame buffer in an order determined by the sub-groups and the sequence. For example, a pulse width modulator can reorder the data as appropriate.

Figure 21:
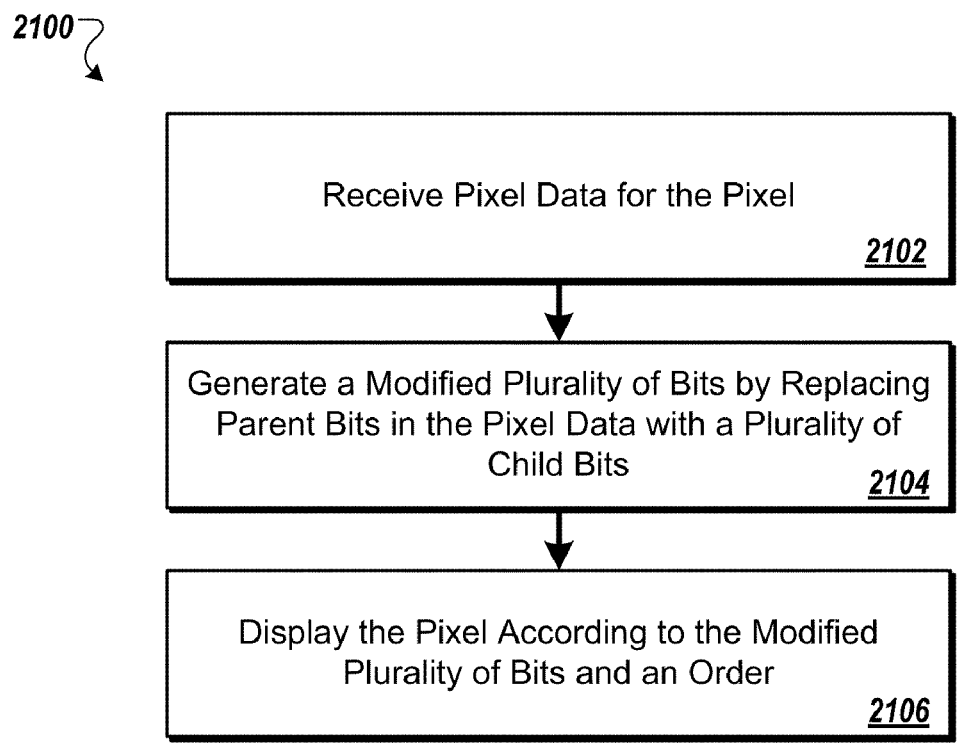
FIG. 21 illustrates an example method for dividing pixel data bits and reordering the bits.

FIG. 21 illustrates an example method 2100 for dividing pixel data bits and reordering the bits. For convenience, the example method 2100 will be described in reference to a system that performs the method 2100. The system can be, for example, the display system 100, or another display system.

The system receives pixel data for a pixel and a color channel (step 2102). The pixel data includes an initial set of bits, where each bit has a value (e.g., one or zero) and a weight. The pixel data can be received, for example, from a dither processor corresponding to each color channel, as described above with reference to FIGS. 17 and 19.

The system generates a modified plurality of bits (step 2104). The modified plurality of bits corresponds to the initial set of bits, with some parent bits replaced with child bits, for example, as described above with reference to FIG. 18.

The system then displays the pixel according to the modified plurality of bits and an order (step 2106). The order can separate two bits in the modified plurality of bits with a weight above a first threshold by at least one bit with a weight below a second threshold (e.g., can separate bits with a higher weight by at least one bit with a lower weight), for example, by grouping bits with higher weights with bits with lower weights as described above with reference to FIG. 18. For example, in FIG. 18, child bits 6 and 7 are separated by child bit 1 in the order indicated by the grouped pixel data. Child bits 6 and 7 each have a weight of sixteen and child bit 1 has a weight of one. Therefore, the order separates two bits with a weight above a first threshold (a threshold of fifteen) with a bit with a weight below a second threshold (a threshold of two). As another example, the order similarly separates child bits 6 and 11 (with weights above a threshold of fifteen) by child bit 1 (with a weight below a threshold of two), as well as several other bits in the order. The system can choose the first threshold and the second threshold empirically, for example. The first and second threshold can be the same number, or can be different numbers. The order can also include bits for other color channels and can place bits from different color channels next to each other in the order, for example, as described above with reference to FIG. 19. In some implementations, the system displays the pixels according to the modified plurality of bits and an order by storing the modified plurality of bits in the order in a frame buffer, processing the bits in the frame buffer in sequence with a pulse width modulator, and providing the resulting bit planes to a display device. In alternative implementations, the system stores the pixel data unmodified in the frame buffer, and accesses the stored pixel data in accordance with the order, thus generating the modified plurality of bits as they are needed by the display device. For example, a pulse width modulator can reorder the data as appropriate.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a digital signal processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, including, for example, a digital signal processor. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for displaying a digital image, the method comprising:
   receiving frame data for a frame of the digital image to be displayed;
   determining two or more dither patterns for the frame;
   applying each of the dither patterns to the frame data, resulting in a sequence of dithered sub-frames; and
   displaying the dithered sub-frames in sequence, by operation of an image processor, in place of the frame.

2. The method of claim 1, where determining the dither patterns for each frame comprises: obtaining dither patterns corresponding to a frame count for the frame and a sub-frame count for each dithered sub-frame.

3. The method of claim 1, where each dither pattern is one of a series of temporal and spatial constant dither patterns generated from a dither ordering table.

4. The method of claim 1, where each dithered sub-frame is represented as respective pixel data for each respective pixel in the sub-frame and a respective color channel in a plurality of color channels.

5. The method of claim 4, where displaying the dithered sub-frames in sequence further comprises performing the following for each respective pixel:
   grouping the pixel data for the pixel and each respective color channel into a plurality of sub-groups of pixel data; and
   displaying the pixel according to a sequence for the sub-groups of pixel data, where each pair of sub-groups for a color channel is separated by at least a sub-group for another color channel in the sequence.

6. The method of claim 5, where the pixel data for each respective pixel and each respective color channel comprises an initial plurality of bits, each bit having a value and a weight, and where grouping the pixel data for each color channel into a plurality of sub-groups of pixel data comprises:
   generating a modified plurality of bits corresponding to the initial plurality of bits where one or more parent bits in the initial plurality of bits is replaced by a plurality of child bits corresponding to the parent bit, where each child bit has a value equal to a value of the parent bit and a divided weight that is proportionate to the weight of the parent bit, and where the divided weights of the child bits corresponding to the parent bit add up to the weight of the parent bit; and
   displaying the pixel according to the modified plurality of bits and an order for the modified plurality of bits.

7. The method of claim 1, further comprising using a color lookup table to determine a color value for pixels in the frame before determining a respective dither pattern for each sub-frame.

8. A method for displaying a digital image, the method comprising:
   receiving pixel data of the digital image to be displayed for a pixel and each respective color channel in a plurality of color channels, where the data for each pixel comprises a plurality of bits and where each bit in the plurality of bits has a weight;
   grouping the pixel data for each color channel into a plurality of sub-groups of pixel data; and
   displaying the pixel, by operation of an image processor, according to a sequence for the sub-groups of pixel data, where each pair of sub-groups for a color channel is separated by at least a sub-group for another color channel in the sequence.

9. The method of claim 8, wherein displaying the pixel further comprises:
   generating a sequence of sub-frames for the frame; and
   displaying the pixel according to the sequence of sub-frames.

10. A method for displaying a digital image, the method comprising:
receiving pixel data of the digital image to be displayed for the pixel and a color channel, where the pixel data comprises an initial plurality of bits, each bit having a value and a weight;
generating a modified plurality of bits corresponding to the initial plurality of bits where one or more parent bits in the initial plurality of bits is replaced by a plurality of child bits corresponding to the parent bit, where each child bit has a value equal to the value of the parent bit and a divided weight proportionate to the weight of the parent bit, and where the divided weights of all child bits corresponding to the parent bit add up to the weight of the parent bit; and
displaying the pixel, by operation of an image processor, according to the modified plurality of bits and an order for the modified plurality of bits.

11. The method of claim 10, where the order separates two bits with a weight above a first threshold by at least one bit with a weight below a second threshold.

12. The method of claim 10, where displaying the pixel according to the modified plurality of bits comprises:
generating a modified plurality of bits for the pixel for each color channel in a plurality of color channels;
grouping the bits in each modified plurality of bits into a plurality of sub-groups of bits according to the order for each modified plurality of bits, where each sub-group includes one or more bits; and
displaying the pixel according to a sequence for the sub-groups of bits, where each pair of sub-groups for a color channel is separated by at least a sub-group for another color channel in the sequence.

13. A display system, comprising:
an image processor configured to display a frame of a digital image, the image processor configured to perform operations comprising:
receiving frame data for the frame;
determining two or more dither patterns for the frame;
applying each of the dither patterns to the frame data, resulting in a sequence of dithered sub-frames; and
displaying the frame by displaying the dithered sub-frames in sequence, in place of the frame.

14. The display system of claim 13, where determining the dither patterns for each frame comprises: obtaining dither patterns corresponding to a frame count for the frame and a sub-frame count for each dithered sub-frame.

15. The display system of claim 13, where each dither pattern is one of a series of temporal and spatial constant dither patterns generated from a dither ordering table.

16. The display system of claim 13, where each dithered sub-frame is represented as respective pixel data for each respective pixel in the sub-frame and a respective color channel in a plurality of color channels.

17. The display system of claim 16, where displaying the dithered sub-frames in sequence further comprises performing the following for each respective pixel:
grouping the pixel data for the pixel and each respective color channel into a plurality of sub-groups of pixel data; and
displaying the pixel according to a sequence for the sub-groups of pixel data, where each pair of sub-groups for a color channel is separated by at least a sub-group for another color channel in the sequence.

18. The display system of claim 17, where the pixel data for each respective pixel and each respective color channel comprises an initial plurality of bits, each bit having a value and a weight, and where grouping the pixel data for each color channel into a plurality of sub-groups of pixel data comprises:
generating a modified plurality of bits corresponding to the initial plurality of bits where one or more parent bits in the initial plurality of bits is replaced by a plurality of child bits corresponding to the parent bit, where each child bit has a value equal to a value of the parent bit and a divided weight that is proportionate to the weight of the parent bit, and where the divided weights of the child bits corresponding to the parent bit add up to the weight of the parent bit; and
displaying the pixel according to the modified plurality of bits and an order for the modified plurality of bits.

19. The display system of claim 13, where the image processor is further configured to perform operations comprising using a color lookup table to determine a color value for pixels in the frame before determining a respective dither pattern for each sub-frame.

20. A display system, comprising:
an image processor configured to display a pixel of a frame of a digital image, the image processor configured to perform operations comprising:
receiving pixel data for the pixel and each respective color channel in a plurality of color channels, where the data for each pixel comprises a plurality of bits and where each bit in the plurality of bits has a weight;
grouping the pixel data for each color channel into a plurality of sub-groups of pixel data; and
displaying the pixel according to a sequence for the sub-groups of pixel data, where each pair of sub-groups for a color channel is separated by at least a sub-group for another color channel in the sequence.

21. The display system of claim 20, wherein displaying the pixel further comprises:
generating a sequence of sub-frames for the frame; and
displaying the pixel according to the sequence of sub-frames.

22. A display system, comprising:
an image processor configured to display a pixel of a digital image, the image processor configured to perform operations comprising:
receiving pixel data for the pixel and a color channel, where the pixel data comprises an initial plurality of bits, each bit having a value and a weight;
generating a modified plurality of bits corresponding to the initial plurality of bits where one or more parent bits in the initial plurality of bits is replaced by a plurality of child bits corresponding to the parent bit, where each child bit has a value equal to the value of the parent bit and a divided weight proportionate to the weight of the parent bit, and where the divided weights of all child bits corresponding to the parent bit add up to the weight of the parent bit; and
displaying the pixel according to the modified plurality of bits and an order for the modified plurality of bits.

23. The display system of claim 22, where the order separates two bits with a weight above a first threshold by at least one bit with a weight below a second threshold.

24. The display system of claim 22, where displaying the pixel according to the modified plurality of bits comprises:
generating a modified plurality of bits for the pixel for each color channel in a plurality of color channels;
grouping the bits in each modified plurality of bits into a plurality of sub-groups of bits according to the order for each modified plurality of bits, where each sub group includes one or more bits; and displaying the pixel according to a sequence for the sub-groups of bits, where each pair of sub-groups for a color channel is separated by at least a sub-group for another color channel in the sequence.

* * * * *